US008711732B2

(12) United States Patent
Johnson

(10) Patent No.: US 8,711,732 B2
(45) Date of Patent: Apr. 29, 2014

(54) SYNTHESIZED INTEROPERABLE COMMUNICATIONS

(76) Inventor: Richard G. Johnson, Pittsburgh, PA (US)

( * ) Notice: Subject to any disclaimer, the term of this patent is extended or adjusted under 35 U.S.C. 154(b) by 264 days.

(21) Appl. No.: 11/592,736

(22) Filed: Nov. 3, 2006

(65) Prior Publication Data

US 2007/0124144 A1   May 31, 2007

Related U.S. Application Data

(63) Continuation-in-part of application No. 11/545,731, filed on Oct. 10, 2006, and a continuation-in-part of application No. 11/486,445, filed on Jul. 13, 2006, said application No. 11/545,731 is a continuation-in-part of application No. 11/137,115, filed on May 25, 2005.

(60) Provisional application No. 60/787,299, filed on Mar. 30, 2006, provisional application No. 60/708,932, filed on Aug. 17, 2005, provisional application No. 60/709,019, filed on Aug. 17, 2005, provisional application No. 60/698,687, filed on Jul. 13, 2005, provisional application No. 60/574,963, filed on May 27, 2004, provisional application No. 60/636,761, filed on Dec. 16, 2004, provisional application No. 60/679,615, filed on May 10, 2005, provisional application No. 60/678,958, filed on May 11, 2005.

(51) Int. Cl.
 *H04L 12/16* (2006.01)

(52) U.S. Cl.
 USPC ........... 370/259; 370/260; 370/351; 370/352; 370/546

(58) Field of Classification Search
 USPC .......... 370/259, 260, 285, 351, 352, 419, 546
 See application file for complete search history.

(56) References Cited

U.S. PATENT DOCUMENTS

| | | | |
|---|---|---|---|
| 3,792,470 A | 2/1974 | Donovan et al. | |
| 5,212,021 A | 5/1993 | Smith et al. | |
| 5,475,626 A * | 12/1995 | Viletto | 361/679.55 |
| 5,969,501 A * | 10/1999 | Glidden et al. | 320/101 |
| 6,389,114 B1 * | 5/2002 | Dowens et al. | 379/52 |
| 6,438,215 B1 * | 8/2002 | Skladman et al. | 379/67.1 |
| 6,541,978 B1 | 4/2003 | Benveniste et al. | |
| 6,603,838 B1 | 8/2003 | Brown et al. | |
| 7,039,205 B1 | 5/2006 | Carter et al. | |
| 7,050,511 B2 * | 5/2006 | Jeong et al. | 375/301 |

(Continued)

OTHER PUBLICATIONS

Arland, Richard (Interoperability: Problem Solved?) Popular Communications, Nov. 2006.*

(Continued)

*Primary Examiner* — Wei Zhao
*Assistant Examiner* — Robert M Morlan

(57) ABSTRACT

A method for interoperable communications including at least the step of: a) at least one radio user's being able to transmit at least one transmission on a first radio frequency to a computer having at least one sound card and at least two sound card channels on one or more sound cards, wherein each of the at least two sound card channels is programmed to receive and process transmissions from at least two separate radio frequencies. This configuration creates a new way of interfacing virtually any speaker with virtually any computer, and allows a paradigm shift of communications organization such that everyone can talk at once, literally, and still "hear" everyone else.

6 Claims, 2 Drawing Sheets

(56) References Cited

U.S. PATENT DOCUMENTS

| | | |
|---|---|---|
| 2002/0116176 A1 | 8/2002 | Tsourikov et al. |
| 2003/0069002 A1* | 4/2003 | Hunter et al. ............... 455/404 |
| 2004/0077347 A1* | 4/2004 | Lauber et al. ............... 455/428 |
| 2005/0084081 A1* | 4/2005 | Manto .................... 379/114.05 |
| 2006/0258336 A1 | 11/2006 | Sajor et al. |
| 2008/0274761 A1* | 11/2008 | Block et al. ................. 455/517 |

OTHER PUBLICATIONS

Los Alamos Amateur Radio Club "Public Service and Software" Sep. 3, 2004.*
Navy Mars "More on MT-63" Apr. 7, 2003.*
QSL.net "MT63 Technical Description" Dec. 28, 2003.*

* cited by examiner

OES DATABASE -- 25 MAY 2005

Amateur Callsign : _____
License Class : _____

OPERATOR INFORMATION
Last Name : _____
First Name : _____
Middle Initial : _____
Street Address : _____
City : _____
State : _____ Zip : _____

CONTACT INFORMATION
Email : _____@_____
Telephone Numbers :
Home : (___) ___-____   Work : (___) ___-____
Cell : (___) ___-____   Pager : (___) ___-____
SMS : (___) ___-____    Other : (___) ___-____
Best way to contact : _____

Station Description
HF NVIS? ☐YES ☐NO
HF Antennas : _____
VHF Antennas : _____
UHF Antennas : _____

Battery Operations ? ☐YES ☐NO
Duration of Battery Operations : _____ Hrs

STATION INFORMATION & CAPABILITIES

| Band | Frequency | Mode | Capable ? |
|---|---|---|---|
| 80-Meters | 3.983 MHz | Phone - LSB | ☐Y ☐N |
| 80-Meters | 3.620 MHz | 300 Baud Pactor | ☐Y ☐N |
| 60-Meters | 5,330.5 MHz | Phone - USB Dial | ☐Y ☐N |
| 40-Meters | 7.272 MHz | Phone - LSB | ☐Y ☐N |
| 40-Meters | 7.100 MHz | 300 Baud Pactor | ☐Y ☐N |
| 6-Meters | 50.300 MHz | Phone - USB | ☐Y ☐N |
| 6-Meters | 52.525 MHz | Phone - FM | ☐Y ☐N |
| 6-Meters | 50.62 MHz | 9600 Baud Packet | ☐Y ☐N |
| 2-Meters | 144.250 MHz | Phone - USB | ☐Y ☐N |
| 2-Meters | 145.000 MHz | Phone - FM | ☐Y ☐N |
| 2-Meters | 145.01,03, 05,07,09 MHz | 1200 Baud Packet | ☐Y ☐N |
| 70 cm | 432.100 MHz | Phone - USB | ☐Y ☐N |
| 70 cm | 446.000 MHz | Phone - FM | ☐Y ☐N |
| 70 cm | 441.075 MHz | 1200 Baud Packet | ☐Y ☐N |
| 70 cm | 441.050 MHz | 9600 Baud Packet | ☐Y ☐N |

OPERATOR QUALIFICATIONS
☐ FM   ☐ LSB   ☐ USB   ☐ Packet   ☐ APRS
☐ CW   ☐ PSK31 ☐ Packet ☐ Pactor
☐ MDT™ ☐ ARMS™ ☐ Tone63™ ☐ Porta-Browser™ ☐ User Echolink®   ☐Link   ☐Repeater
Node Number : _____
Palm®-OS-based PDA   ☐Yes   ☐No Date : _____
Comments : _____

FIG.2

SYNTHESIZED INTEROPERABLE COMMUNICATIONS

CROSS REFERENCE TO RELATED APPLICATIONS

This application is a continuation-in-part of U.S. application Ser. Nos. 11/545,731, filed Oct. 10, 2006, Ser. No. 11/486,445, filed Jul. 13, 2006 and Ser. No. 11/137,115, filed May 25, 2005, and claims priority to U.S. Provisional Patent Applications No. 60/574,963, filed May 27, 2004; No. 60/636,761, filed Dec. 16, 2004; No. 60/679,615, filed May 10, 2005; No. 60/679,958, filed May 11, 2005; No. 60/787,299, filed Mar. 30, 2006; No. 60/708,932, filed Aug. 17, 2005; No. 60/709,019, filed Aug. 17, 2005; and No. 60/698,687, filed Jul. 13, 2005, each of which is incorporated herein by reference.

BACKGROUND OF THE INVENTION

1. Field of the Invention

The present invention pertains to governing computers with radio transmissions, and to configuring data so that it is accessible by any mode of communication including a radio transceiver. The invention pertains in part to restoring communications before and during terrorist threats or acts or in emergencies, and focuses on making heretofore non-interoperable radio systems (such as Police, Fire, Hazmat, etc.) interoperable even under attack or emergency conditions (when such interoperability is most needed).

2. Description of Related Art

In a disaster scene, it is typical to find two types of devices. First, radios are plentiful. Second, computers are available. It has been this inventor's mission to invent new ways of interconnecting radios and computers to provide data transfer, and data management systems, for regional disasters. Traditionally, amateur radio has been a fertile ground for new technology development. Since the 1940s, numerous products including cellphones, developed from amateur radio, have been commercialized. The importance of radio technology in providing communications during emergencies is evident today in such events as the earthquake and tsunami in December of 2004, and the Sep. 11, 2001 attack. As reported in The Wall Street Journal, "With Hurricane Katrina having knocked out nearly all the high-end emergency communications gear, 911 centers, cellphone towers and normal fixed phone lines in its path, Amateur Radio Operators have begun to fill the information vacuum. In an age of high-tech, real-time gadgetry, it's the decidedly unsexy "ham" radio—whose narrow audio bandwidth has changed little since World War II—that is in high demand in ravaged New Orleans and environs."

Narrow-band battery operated radios work well when others do not because they are simple and readily available in disaster scenes. At this writing, the ability of police, fire and medical rescue and etc. to coordinate their radio communications in a local, regional or national emergency is still an elusive dream. The goal of "interoperability" may be much sought after, but no national, state or local governments have yet solved the problem of actually coordinating police, fire and medical communications when commercial power is unavailable and communications towers and repeaters are inoperative due to damage or overload. This inventor's solutions transmit data quickly and reliably over those radios, leveraging both the ubiquitous legacy equipment and the expansive network of voice-based radio repeaters that are already deployed nationwide.

As a result, in an age when messages are sent and received with relentless fury, the means for simple, effective, reliable and inexpensive communications are still elusive and many times—especially in emergencies when they are most needed—completely unavailable.

The greatest problem facing further development in emergency radio communications is the problem of interoperability. Because different radio systems operate on different frequencies, they are not by nature interoperable. The result is simple and inevitable: radios on different frequencies cannot communicate with each other.

The traditional solution to this particular interoperability problem is a device known as an interoperability bridge. In its simplest terms, an interoperability bridge is a switchboard that either manually or physically connects two or more frequencies together. Although this solution is viable and in some circumstances works well, it has a significant drawback. Once two frequencies, or more than two frequencies, are interconnected through the interoperability bridge, spoken voice communications (known as traffic) on one frequency are automatically placed simultaneously on all other frequencies interconnected by the interoperability bridge. This consumes valuable airtime on all frequencies, making the standard traditional interoperability bridge solution unacceptable in threat situations, emergencies or disasters, when heavy traffic turns into a literal radio traffic jam.

SUMMARY OF THE INVENTION

In order to avoid such communications traffic jams and to render truly interoperable radio communications using two or more frequencies, the present invention is a method for interoperable radio communications including the steps of: a) at least one radio user's transmitting at least one transmission on a first radio frequency to a computer having at least one sound card and at least two sound card channels on one or more sound cards, wherein each of said at least two sound card channels is programmed to receive and process transmissions from at least two separate radio frequencies; b) said radio user's simultaneously or subsequently posting, via the preprogrammed computer, said transmission as either a sound recording or a transcribed voice or data file obtained from the received transmission to a folder on the computer; and c) at least a second radio user's transmitting and/or receiving, on a second radio frequency via a sound card channel, to or from the same or another folder on the same computer, to enable said at least two users to transmit and/or receive messages from said computer via said first and second radio frequencies. If the computer folders are periodically replicated on more than one computer by separate radio transmission, each radio user may transmit to the same or a different computer. Any user may be human or robotic (or a combination of human action and robot or other automated equipment) either to transmit or to receive messages.

Stated a little differently, a way to understand a core feature of the present invention is that it is method for interoperable radio communications, comprising: a) providing a computer having at least one sound card and at least two sound card channels; b) configuring said at least two sound card channels to receive transmissions from at least two separate radio frequencies; programming the computer to receive transmissions to the sound card channels and further programming said computer to post either sound recording or transcribed voice or data files obtained from a received transmission via the sound card channels to a folder on the computer; and making the folder accessible by radio communication to a user operating a radio on one of the at least two frequencies.

The extensions of the above core embodiments of the invention are more apparent in the below section.

BRIEF DESCRIPTION OF THE FIGURES

FIG. 2 is a sample OES database record according to the present invention.

DESCRIPTION OF THE PREFERRED EMBODIMENT(S)

Issue of Homeland and National Security

Figure 1:
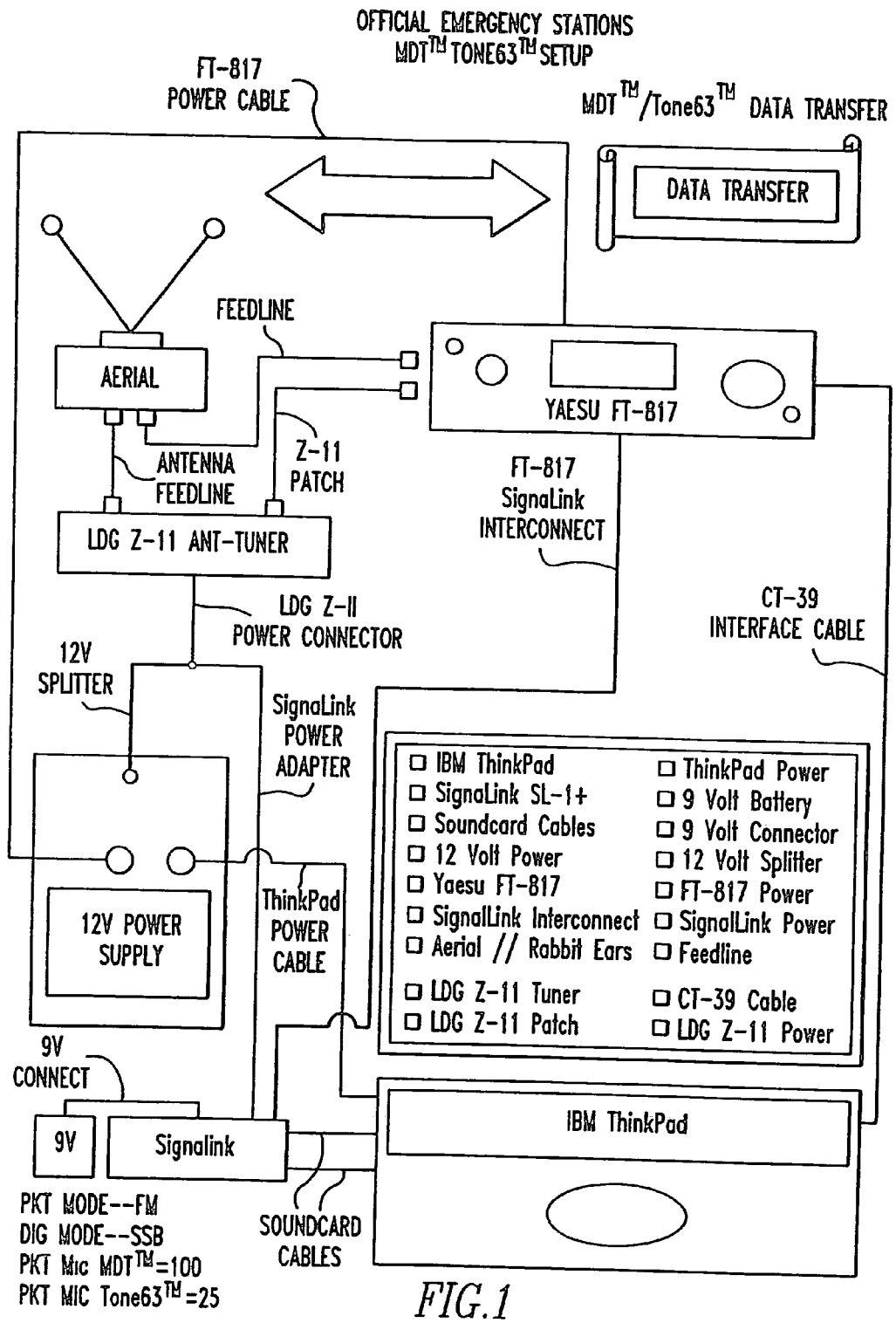
FIG. 1 is a flow diagram illustrating an "Official Emergency Stations. Setup" according to the present invention.

The following is a prefatory note regarding United States national security. The present invention enhances communications most effectively in a defensive emergency—when first responders need to obtain orderly information immediately, or when corporate or hospital emergency plans need to take effect, or when ordinary civilians need to be in touch immediately with their supervisors or family members. The present invention is no more a threat to national security, if and when this invention is practiced outside the United States, than is any other form of communication already in existence, and probably less so. For example, in any aggressive campaign, the sorting of a traffic jam of communications is not generally an issue—the campaign has inevitably been planned in advance and executed, typically, with stealth. By contrast, it is the fast defensive action of a responder that requires critical interoperable communications, because multiple unknown situations have to be assessed, reported, and acted on seemingly all at once by a wide variety of individuals who all start out with little or no information about an unfolding event.

The "Communications Sophisticate"

As this is being written, commercial systems of any type (radio, cellular telephone, Internet, etc.) allow only relatively primitive communications by true interoperability standards. This is as true for any individual's routine day-to-day communications as it is for emergency responders in a disaster situation. Moreover, there is a widespread assumption that nothing better (than is presently available) is even remotely possible. In fact, without the following examples, the reader would likely be skeptical that he or she were at this writing in fact a "communications primitive" at all, and therefore would not be particularly open to the possibility that something would have to change in order to become a "communications sophisticate." However, the following examples (scenarios) are enlightening on this point, followed by the solutions offered by the present invention.

The following scenarios also evoke understanding of the conceptual problems creating communications interoperability challenges today, whether day-to-day or in an emergency, namely: a) bringing order to the chaos of essential communications traffic; b) creating ubiquitous access to all essential communications by any available communications mode; and c) removing all essential communications from the constraining exigencies of only chronological real-time. When a user a) can send and receive appropriately prioritized data (prioritized by his or her own importance standards, not someone else's), b) can send and receive any or all data using any available mode of communication available at the time (handheld radio, cellular telephone, land line telephone, laptop or other computer with or without traditional Internet access, laptop or other computer with a radio/walkie-talkie/tin-can-and-string (seriously) nearby); and c) can send and receive all data without necessarily having to send and/or to receive all or even any of it in real time or even in the prioritized sequence, then the "communications primitive" becomes a "communications sophisticate." A communications sophisticate does not have to carry or even to own multiple electronic gadgets—he or she can choose to use several devices or only one. A communications sophisticate can send and receive messages when and where they are needed most, both day-to-day and during the sooner-or-later-inevitable emergency characterized by sporadic or total failures of telephone, cellular telephone, power and Internet. For example, of what ultimate reliability is an elaborate system of telephony and Internet protocols if, as a result of a single storm and the attendant power, tower and cable failures, family members cannot locate one another? (That emergency moment is a main reason all the family members have cellular telephones, and yet that moment is the time when the cellular telephones predictably will not work.) Even when there is no palpable emergency, of what purpose are multiple communications modes in day-to-day life if one is enslaved to all of them, so that one is never free to concentrate fully or do anything, really, without interruption lest a key message somehow be missed among the other three-thousand total messages one typically fields in an ordinary day while monitoring all the modes by which one may be reached?

Scenario Number 1—the Local Disaster.

The following is a true story of a mock disaster drill, and its troubling results, in Western Pennsylvania. A terrorist (an actor) on a simulated passenger train had been tailed on his way to Pittsburgh, Pa. In the terrorist's possession were two harmless stage properties, namely, a simulated "dirty bomb" as well as a simulated chemical bomb, "detonation" of both of which were intended for a highly populated area. The public safety personnel who successfully identified the terrorist prepared to confront the terrorist, who had boarded the simulated west-bound passenger train, by making an unscheduled train stop so that police could board the train, separate and disarm the terrorist and in turn arrest and evacuate him. Unfortunately, the unscheduled stop tipped off the terrorist that his apprehension was imminent and, in desperation, the terrorist detonated (in pantomime) both bombs. Scores of passengers (actors) pretended to be injured for the purpose of the ensuing drill, and the remainder of the public service drill involved very real responses by actual public service responders reacting to the drill scenario (but without actually performing any medical treatments per se.)

Rescue operations went into immediate effect. Rescue operations were complicated by the need to deploy HazMat personnel to make it safe for rescue workers to enter the area, in view of the chemical bomb report. The communications challenges in such a situation were that absolutely nothing was routine, and everything needed to happen at once. The Incident Command System required immediate muster of all personnel in the system (Fire, Police, Hazmat, EMT, etc.) together with a way to coordinate communications. However, Police operated on one radio frequency, Hazmat on another, Fire on yet another, and so on. Beyond just the seeming incompatibilities of the different radio frequencies, too, it seemed that everyone needed to talk at once, because everything needed to happen at once. No one could hear anything, as a result.

At the debriefing following the drill, every single department involved reported that the failure of the day had been communications. HazMat teams never received a report of what the chemical agent in the chemical bomb had been, or even if or when it had been detonated. EMT did not hear what injuries had occurred or where the patients were located.

Hospitals did not receive timely or reliable reports of which patients, with which injuries, would be arriving or when— and certainly no one was able to coordinate to send all the members of a family to the same hospital or to prevent too many of a certain type of injury from going to the same first aid center all at the same time. Police were not apprised whether the terrorist had survived the dual detonations and thus did not know if the terrorist was still at large and hence still a security risk. Fire did not know what or when Hazmat intended to deploy, in part because Hazmat had not received intelligence as to chemical agent extent or identity. Over and over, speakers at the debriefing confirmed that any individual wishing to send or to receive any sort of data had to do it in real time—after confirming real-time contact with the recipient or sender, which often could not be made due to so much activity all happening at once. In many cases, several people were all trying to raise several other people on their radios all at the same time. In short, at the disaster scene, all the communications in fact were in chaos, and no one (except the present inventor) at the debriefing had any idea what to propose to make the deployment work better the next time.

Scenario Number 2: Everyday Civilian Life

Many people are familiar with the public safety communications challenges evidenced by Scenario Number 1, above, but do not believe their daily lives are all that chaotic respecting communications. However, the following are fairly typical business and family communications failures that inevitably occur at the worst possible moment:

a) A severe local windstorm has knocked out power lines and many cellular and land telephone towers and switches within about a 30 mile geographic diameter. A working father's office building closes abruptly due to power outage, and the child's day care center in a building about a mile away has also closed. Murphy's Law being alive and well, the child has also just succumbed to illness at the day care center that day. The few cellular telephone towers which are still operational are overloaded with calls, so no call can be placed to the day care center, nor can any calls be placed to any other family members. The day care center cannot reach the father or any other contact to obtain consent to treat the child's illness; the father cannot contact the day care center to advise of his arrival time. The child is subjected either to no medical treatment at all, minimal medical simple treatment only as previously authorized, or to unauthorized treatment, as well as the anxiety of listening to reports that his father cannot be reached and that his arrival time is not known. The child care workers have no idea when all the children will have been picked up and therefore do not know when they will be able to rejoin their own families, whom they cannot contact to coordinate rendezvous anyway.

b) In a somewhat less widespread storm than described above, a teenaged daughter remaining in the shelter of her high school has a fully charged cellular telephone with her, and has reasonably good cellular telephone signal and tower access because of the relatively milder weather emergency. However, even though her cellular telephone is working, her calls to her other family members fail repeatedly because every other family member is in an area of temporary service failure or call overload. This family has a communications plan, however, which is to call a prearranged out-of-area relative, in another state. This plan fails too, though, because when the teenager calls the out-of-state relative the line is already busy, due to calls' simultaneously being placed to that relative by both the teenager's mother and father. By the time the teenager leaves a voice mail message and the out-of-town relative can return the call, the call load in the teenager's area has increased to the point of overload and the teenager receives no return call or message from the out-of-town relative. In this instance, sporadic cellular telephone service was just as bad, for this family, as complete cessation of service would have been.

c) An executive has a key out-of-town meeting and a flight home on a day when her 8-year-old son is unexpectedly home with influenza. The executive instructs her son to telephone if he needs anything, and thus the executive takes her cellular telephone into her meeting and sets the telephone device on vibrate so as not to disrupt the meeting with a ringing telephone. Although it is possible to discern which incoming call is from the son, if any, the executive must continually monitor, if not actually answer, the cellular telephone calls to determine whether it is her son whom is calling, or someone else. Moreover, after the executive parts with her cellular telephone device to clear security at the airport prior to the flight, she must remember to check the telephone to determine if any key call had been missed, and do so again after her flight home, because nothing will pro-actively prompt her if she misses a cellular call and has a message waiting for a call she does not realize she received (unless she thinks to check the telephone). Naturally, in the busyness of clearing security at the airport the executive does not realize that she has missed a call from her son until the moment that the flight attendant instructs the passengers to turn off their cellular telephones.

The above scenarios, especially the last one, illustrate that all of us at this writing are so besieged by multiple forms of communication that we take for granted that we must spend a large amount of our daily effort managing both the communications we receive and the communications we send, and that even then we are very likely to miss a key real-time communication anyway. Those in customer service gladly welcome the opportunity for customers and potential customers to contact them in any way the customer wishes, but this means that telephone, e-mail letters, facsimile letters, regular mail letters, overnight courier letters, and even the IM or SMS type communications known at this writing all have to be monitored, basically constantly. This also means that communicators must have available, and remain near, the equipment necessary to send or deliver those messages (computer, fax machine, etc.). Does the reader begin to believe, now, that there might be (or at least that there needs to be) a better— more sophisticated—way to handle the constant jumble of data traffic, particularly essential data traffic, in our daily lives? Does the reader envision more clearly, too, how critical it is to have a more user-friendly way for emergency responders, in particular, to communicate with one another without chaos?

Synthesized Interoperable Communications

All of the above scenarios (and many more) can be ameliorated or solved by the use of one or more computers, accessible via radio and typically via FM signal having a bandwidth of 3 KHz or less, with the computer(s) most preferably having speech recognition software in association therewith, that handle data by directing every voice or data communication to an appropriate folder (or other discrete quantum of data) equipped with any means of sensing or discerning the recipient or recipients for whom the data is intended. This means that the folders (or other discrete data quanta) can be accessed by any available means (telephone, Internet, radio, etc.) without the constraint of TCP-IP specific addressing, necessarily—the data quanta have a location, but not solely an Internet style address, and thus can be accessed in any way by any recipient authorized by the sender, on any computer in which the folder has been cloned by radio or other transmission. (See the below section on Addressing Via Speech Recognition for this novel addressing paradigm.) The data quantum with location and accessibility, but without having solely a TCP-IP address, is at the heart of the present system and stands alone as an invention in itself. A preferred use of such folders (data quanta) is in conjunction with one or more radio transmissions-because unlike traditional Internet protocols, which involve data transmissions from point to point even when wireless, the present radio transmission of data amounts to a broadcast with all its attendant advantages, namely, potential and omnidirectionality to an unlimited number of recipients.

The above description is so different from radio and Internet communications typical at this writing that a general example is helpful to illustrate the different paradigm. Referring to other sections herein, at a disaster scene the Command Center deploys a laptop computer that is equipped with at least one and preferably multiple copies of ARMS software and/or PortaBrowser, as well as ISI-BRIDGE 63 and at least one sound card with at least two channels or preferably multiple sound cards (or multiple sound pods—or multiple "sound paths" (a sound path is a logical path for transmitting any form of sound from one source to the same or another source)). ARMS (Automatic Radio Messaging Service) typically is configured with speech recognition software, so radio transmissions received from users within range of the computer are typically (but not necessarily) transmitted as speech and are usually (but not necessarily) transcribed by the ARMS software as text, and charged to one of those folders capable of sensing or discerning the recipient for whom the message (data) is intended. With multiple copies of ARMS on a single computer, many users can call in and leave or retrieve messages all at the same time, typically using their handheld radios or any other means of calling in. With ISI-BRIDGE 63, moreover, the sound card (or sound path) routes make it possible for radio users to call in on virtually any frequency— and the sound paths route the user to the ARMS server regardless of the frequency the user calls in on. The computer manages the traffic by posting data to the accessible folders— and all those who need access to particular data are provided with access by the sender of the data. So, a hazardous waste spill report with prevailing wind direction and speed can be posted to a folder specified for access by any user. A particular communication intended only for the Incident Commander is placed in a folder capable of discerning that only the Incident Commander may access the data. The most stunning features of the above, operationally, is that many users can be calling in at once, leaving messages at once, retrieving messages at once, all on different frequencies. Literally, everyone can talk at once and still hear everyone else, as messages are retrieved without necessity of hearing them in real time, and the computer (via the folders) creates the ordering, prioritizing and recipient authorization that brings order out of chaos, particularly when voice mail and e-mail are interchangeable. Because the entire contents of the computers' folders can be replicated on nearby computers—even many computers within range all by data broadcast via radio—no one's communications rely on the operability of a single computer. Multiple computers may continually clone their data contents (via radio broadcast if necessary) if more than one server is available, so that everyone can send and receive data to everyone even if some of the computers in the array happen to fail. Each radio user may log in to any computer in range.

It should be noted in the previous example that the computer is deployed on demand—there is no reliance on a previously-positioned tower which would then have been vulnerable to weather and etc. Having said that, the system MAY be deployed on a permanent basis such as a tower and/or repeater, or attached to the Internet while accessible by radio, even Echolink or the equivalent (and redeployed if compromised) so that a communications sophisticate can receive all communications, or at least all essential communications, via the single source accessible by a chosen mode. For example, with ARMS servers equipped with speech recognition and/or message transcription capability, a user has flexibility whether to call in by telephone or radio and listen to ALL messages as voice mail, or whether to use Internet-Protocol or radio communication (see other passages herein regarding radio/computer interfaces elsewhere herein) with the server via a laptop or other computer to receive ALL messages as text or e-mail, even those messages that were left as (transcribable) voice mail. As a practical matter, this means that an extremely busy person can sit at his or her laptop computer and, for the first time, review ALL incoming messages as e-mail communications as long as they are sent using the innovations of this system, including but not limited to voice mail messages, facsimile transmissions, podcasts, photographs, images, graphics, and even complex audio and video feeds. If that same person prefers, due to his or her circumstances, to telephone or radio the server and listen to all the content rather than to read it, the voice mail/e-mail and etc. are all completely interchangeable, and the user may do so.

One key to all the above interchangeability is the innovation that it is possible at all to connect at least a computer and a radio, or two or more computers, via a sound card or other "sound path" as defined above. The development of the Internet so far has not contemplated such a thing for either 3 KHz or narrower bandwidth transmissions or, in the plural, as a way to interface two or more communications on different frequencies into the same server/software/folders, regardless of bandwidth. Therefore, the invention embraces a hardware device consisting of two or more sound cards, sound pods or other hardware bearers of "sound paths," in connection with at least one sound or signal generating device (or interface therefore) that generates and/or receives a signal having a bandwidth of 3 KHz or less, generally but not necessarily as an FM signal (because two tin cans and a string will work to connect one sound path outfitted with a speaker and another sound path (on the same computer or another computer)) having a microphone associated therewith. The idea here is that the sound paths (on sound cards, sound pods and etc., both of which hardware items are already well known at this writing and other sound path devices will undoubtedly be developed hereafter) are the literal path(s) by which communications can be made interoperable in the largest sense of that word, into as few as one computer server, or into many computer servers. In fact, the present inventor believes that the day is not extremely far off in which we will look back at broadband wireless communications and wonder why we used broadband for so long, because narrowband is so much more versatile and reliable and, when necessary, can be run with power management possible even when only batteries are available. The device, more particularly, embraces equipment containing at least two sound paths, at least one signal receiving interface, and at least one signal generating interface. Generally, however, each of said two or more sound paths will be fitted with an interface capable of sending or receiving a signal, so that each sound path can when necessary be accessed via a different radio frequency due to appropriate tuning of the signal receiving and/or signal sending interface. Beyond this innovation, the equipment to implement this described interconnection of signals via sound paths already exists at this writing and can be realized by those skilled in the art without experimentation.

Another way of understanding an embodiment of the invention is that it uses the following combination of synergized technologies: a) the availability of a radio transceiver, capable of transmitting and/or receiving on basically any (but typically an FM) radio frequency (preferably of a 3 KHz bandwidth or less); b) the availability of a computer within signal range of the transceiver; c) a concomitant transmission mode by which data can be received and/or generated by the computer; and d) software on the computer which can organize and/or prioritize. The difference between these radio transmissions and the Internet wireless already known at this writing is that the radio transmissions are direct—from computer to computer via sound card and sound card interface—without need to access the Internet at all (although the Internet can also be used concomitantly.) While there are many ways and permutations of setting up the inventive systems, the triple key to all of them is that because a computer can be governed by a radio transmission—or can send a radio transmission—A) anyone with a battery-operated radio can vault any communications obstacle by communicating to and from an available computer literally through the air, if necessary, via the radio; B) any user can take advantage of organizing, prioritizing and affirmative alerting as executed by the computer and C) the real-time necessity of chronological communication is suspended by the computer, which stores messages for retrieval without regard to real time (much in the way that e-mail and even IM communications can take place in suspended time) particularly when most or all communications are rendered by the computer as both voice and text and the recipient can thus choose whether to receive a voice message or a text message.

The above-described "concomitant transmission" mode may be any of human voice (speech), computer generated speech, decodable tone patterns or other modulated acoustic or electromagnetic signal. By "radio," herein, the broadest possible definition of radio signal is intended including, but not limited to, modulated light or any other encodable electromagnetic frequency sendable without wires. As a practical matter, the radio transmission is of a signal having a bandwidth of 3 KHz or narrower. There is nothing wrong with "broadband" as long as the communications infrastructure—hardware, and commercial power—are all operating, but essential communications must be able to be rendered as narrowband transmissions at will—3 KHz or narrower, usually FM—so that they can be sent and received by radio when the broadband communications infrastructure fails. Even when the infrastructure does not fail, it is equally important to use the computer as the communications traffic control, so that messages are ordered and taken out of real time. By "speech recognition software in association therewith" is meant that the computer that receives the messages need not be the actual computer equipped with the speech recognition software, but that a speaker's voice traffic is transcribed as text as a result of the speaker's speaking or transmitting in a way accessible by speech recognition software already trained by the speaker, so that further propagation or transmission of the speech is by way of text (already transcribed) or by computer generated voice replicated after the speaker's speech has been transcribed. This is very different from the way speech recognition software is being used commercially at this writing. For example, according to the prior art, a caller may reach a computer-voice and speech transcription enabled directory assistance line, and the speech recognition software will attempt to decode the speech of the caller. This speech recognition software has not been trained to recognize the speech of the specific caller, however. The speech recognition function tries to recognize speech generally, therefore, and does not work very well (as the reader has no doubt experienced). In most or all the instances of the present invention where speech recognition software is used, however, the speech recognition software is used right at the time of the speech transmission, to transcribe it immediately, and thereafter the "speech" can be further transmitted (or sent by any mode) as text, computer-generated voice font, or other reliable transmission. The ability of computer-generated voice fonts to make good radio transmissions is described elsewhere in this text as MDT™, because speech recognition software can be trained to recognize computer generated voice fonts as well as they can be trained to recognize human speech, and the computer generated voice fonts render much more uniform speech patterns than human speakers ever can.

For a focused, effective, and rapid response to a regional disaster, the portable emergency radio communications operator must have clear strategies to establish reliable interoperable bridges between radio systems that can operate either simultaneously or concurrently, and which can both "push" and "pull" data. The present invention describes just such an approach, using the "Inverse Scanner Interoperability Bridge" using ARMS™ and Tone63™" to provide interoperability.

This invention builds upon four previous inventions of this inventor, namely, MDT™, ARMS™, Porta-Browser™, & Tone63™, and this specification assumes familiarity with those inventions. The following U.S. patent applications are all hereby incorporated herein by reference to that end: U.S. Application No. 60/787,299, filed Mar. 30, 2006; U.S. Application No. 60/708,932, filed Aug. 17, 2005; U.S. Application No. 60/709,019, filed Aug. 17, 2005; U.S. Application No. 60/698,687, filed Jul. 13, 2005; U.S. Application No. 60/679,958, filed May 11, 2005; U.S. Application No. 60/679,615, filed May 10, 2005; U.S. Application No. 60/636,761, filed Dec. 16, 2004; U.S. Application No. 60/574,963, filed May 27, 2004; and U.S. application Ser. No. 11/137,115, filed May 25, 2005. The following describes six additional interrelated technologies by first describing them, and then showing how their integrated operation solves formerly unsolvable emergency radio interoperability communications dilemmas: Part One—"Addressing Via Speech Recognition" ["AVSR™"]; Part Two—"Frequency Allocation Multiplexing" ["FAM™"]; Part Three—"Inverse Scanner Interoperability Bridge63" ["ISI-Bridge63™"]; Part Four—"A Method for Automatic Collection of Weather Data Using Tone63™ & MDT™ Nodes" ["NWS MDT™ Node-based Auto-Attendant"]; Part Five—"A Method for Transmitting, Managing, and Replicating Sensor Data Using Tone63™ & MDT™ Nodes" ["Sensor Node Net—"Porta-Sensor"]; and Part Six—"Power in Emergency Radio Communications" ["Portable Power-Sink"].

Part One—Addressing Via Speech Recognition (History of Using Tones for Control and Voice as the Data)

There is a long-standing, prior art tradition in the electronics community of using tones as a way of controlling data in voice format. For example, early slide projectors used cassette tapes to control not only the advance from one slide to another, usually through a system of tones in the left channel, but also data in voice format in the right channel. Similarly, modern telecommunications systems employ the same basic technique. Cellphones, for example, are controlled by a series of control tones not audible to the user, addressing and directing the location of the data, which data is the voice content. For Addressing Via Speech Recognition (AVSR™), however, the opposite occurs, namely, using speech as the control information, and passing tones, digital material or more voice as data. For example, when a user logs into the ARSM™ system, the system uses AVSR™ to associate the user with a folder. Similarly, Porta-Browser™ associates the user's identity (i.e., the user's Incident Command Structure function) with html or xml files in that user's folder. ISI-Bridge63™ uses the AVSR™ function of ARMS™ to associate the user's frequency and soundcard with a specific folder on the (non-Internet) server.

Stated another way, AVSR™ broaches what Alvin Toffler called the Fourth Wave, or the synergistic combination of electronic computers with biochemical life. Addressing Via Speech Recognition (AVSR™) is actually a confluence of a computer with a uniquely biological phenomenon—speech, and more particularly, the unique speech of a unique speaker. AVSR™ is more than voice recognition (speech recognition) technology already known in the art, therefore. AVSR™ provides a computing—including computer-enabled communications—function by virtue of its biological element and the ability of a voice to identify the speaker. "Speech-print" generation is a completely noninvasive realization of a Fourth Wave innovation. Whereas a person can be identified by their fingerprints, retinal scans or DNA (with the respective consequences of blackened fingers, retinal laser exposure or tissue sample collection), when a person is individually identified to a computer by the person's voice, the person remains as biologically intact as after any other time the person happens to speak normally. As can be understood better upon consideration of all that follows, the biological interface of a user's speech's not only creating the AVSR™ commands, but also identifying the AVSR™ user, means that biological function and computing technology are Fourth-Wave-juxtaposed. It should be noted that AVSR™ is not the vocal equivalent of tapping a computer keyboard with the fingers—a user's voice never touches the keys or a computer in any way, at least in a tangible physical way. Even beyond this, though, AVSR™ is not generic to possible users or usurpers, so whereas anyone's fingers can tap a computer keyboard and the computer does not know who is tapping, AVSR™ in context does actually identify the individual user. In the context of using an ARMS™ server, for example, (that is, interactive voice mail for radio described in one of the patent applications incorporated herein by reference), even if an imposter can get away with saying "Activate ARMS™ Service" and getting a "Please log in" prompt, subsequent actions of the system will betray the user as an imposter if he or she is not the enrolled (speech-recognition program already trained by him or her) user. In a recorded version of an imposter's voice message, the recipient can easily identify that the voice of the speaker is not of whom the speaker purports, and thus the biologically unique interface serves its purpose. If the message version is text or computer voice replayed via speech recognition transcription, taken from the transmission of an imposter into the account/folder of an enrolled user (whose speech recognition profile has already been trained), the message will have a uniquely distinctive garbled nature that occurs when an untrained or other-trained speech recognition program is subjected to a human voice, for which the program was not trained, that says more than a few common words. This distinctive garble identifies the transmission or message as having been made by an imposter, and AVSR™ thus performs an identification and security function. The phenomenon of imposter-revelation by the combination of AVSR™ and either speech recognition transcription of the radio transmission or message, or voice-recording and replaying of the radio transmission or message, establishes a unique interface between biological users and computers, which Fourth Wave interface as "speech print" appears to be unprecedented.

In summary, then, AVSR™ is the act of commanding of a computer, either locally or by voice radio communication (preferably narrow band), by use of human speech which both directs a data transmission (which follows subsequently and which, without limitation, may be either a tone or a further human voice or computer voice transmission) and which identifies the computer user to the computer by his or her unique speech patterns.

Two different ways of stating some of these ideas include the following. This portion of the present invention is a method of establishing the individual identity of a computer user to a computer, comprising a) programming a computer to recognize the speech of at least one user, followed by b) the addressing of data by the at least one user's speech to and/or from the computer, wherein due to the addressing via speech recognition the computer can distinguish said at least one user from a different user. In a similar vein, the invention is also a method of establishing the identity of a recipient of information, comprising a) programming a computer to recognize the speech of at least one user, followed by b) the addressing of data by the at least one user's speech to and/or from the computer, wherein due to the addressing via speech recognition, the computer can designate the intended recipient of the information. In this way, it can be seen that the user identification function of AVSR™ is effective both as to the transmitting user as well as to the receiving user, even though the identification takes place a little differently (see above description of "distinctive garble" and etc.) Notwithstanding, the present folders (as described above0 may be addressed by any acoustic or electromagnetic transmission, preferably but not necessarily of 3 KHz bandwidth or less.

Part Two—Frequency Allocation Multiplexing

Tone63™ ordinarily uses its full bandwidth (usually narrowband) to update one folder (as described above) at a time, in situations where the radio traffic is high. Should multiple folders need to be updated simultaneously, Tone63™ uses frequency allocation multiplexing (FAM™), as described below, to update all of the folders at once. Normally, Tone63™ uses 64-tone channels of QPSK-FEC spread both temporally (FEC) and spatially (over its 2 kHz or 3 kHz bandwidth). When FAM™ is invoked, Tone63™ divides its bandwidth by the number of simultaneous folders that require to be updated, and defines its resources accordingly. This division takes place using DSP, digital signal processing, applying the appropriate pass band filters, PBF, to the proportional subset of the Tone63™signal. In the example set forth below, Tone63™ would use FAM™ to send five separate multiplexed channels, each one of the five consisting of 12-tone channels of QPSK-FEC (approximately 64/5 rather than one 64-tone channel), which is reconstructed and placed into the addressed folder by the recipient's computer just as though it received the five transmissions serially. Although FAM™ will cause Tone63™ to update each folder proportionately slower, overall, the system will be completely self replicated very quickly and automatically. If Tone63™ is used after addressing with AVSR™, the voice command does the addressing of the computer and the text or other data content is sent by tone thereafter (in contrast with a voice message addressed by tones as occurs in telephony and elsewhere).

Part Three—Inverse Scanner Interoperability Bridge (ISI-Bridge63™)

When a voice or other sound file—locally or by radio transmission—an address a computer, and data records can be sent by tones or other means governed by the voice or other sound addressing, such pieces can fit into an inverse scanner interoperability bridge (ISI-Bridge63™) that makes it feasible for the first time for a plurality of radio operators to transmit on different frequencies and yet all be able to communicate with one another without traffic jams. Generally speaking, at a central computer to which all the radio transmissions and radio receptions desired to be interoperably available are received, either by designated radio receivers on each frequency or by software defined radio for each frequency, the central computer is configured with at least one sound card or sound card channel for each such frequency. By way of the sound card or sound card channel, each transmission may be "heard" by the computer and either transcribed (by speech recognition software, ideally trained to the voice of the specific user) or recorded by wave or mp3 or similar file, followed by posting to an e-mail database, spreadsheet or web-page type file. In other words, each transmission is created in the user's folder and is posted, generally but not necessarily by speech addressing, to the stated recipient's folder, typically using voice commands. In practice, such posted transcribed or recorded messages are much more like traditional radio messages than answering machine messages because each radio user can receive a message waiting tone or indicator while using his or her radio, and immediately direct (via voice addressing, usually) that the waiting transcribed or recorded message be played. The real-time effect of this system is very much like a radio repeater (or store and forward device), in that the recipient waits for and, in this case, prompts, the repetition of a previously transmitted message for the recipient to hear. The entire process can happen so fast, when desired, that in many cases the exchanging of messages can be, but need not be, virtually a real time conversation when the messages adhere to standard radio net format. The advantage of having the option of the recipient's hearing the message when the recipient is ready for it, and recalls or plays the message on command, is that the messages can be reordered as to priority (see below) and will never assault the recipient more than one at a time, which can and does happen in purely real time radio communications.

After it is understood that the ISI-Bridge63™ is a comprehensive system of folders on a centralized computer in which messages can be posted and retrieved to users' folders on an almost instantaneous basis and/or at will, it is easy to see that the ISI-Bridge63™ enables the comprehensive system of folders to substitute for a real-time, net-control directed radio net in such a way as to remove traffic problems. Radio users who wish to hear their messages can hear a computer voice generated rereading of their messages at the time the messages are retrieved, and/or can replay actual voice messages. For example, in a terrorist response setting (and see the below example as well) individual users will have Fire, Police, Hazmat, etc. responsibilities. As messages from Fire and Police are sent to the Hazmat individual, using this system the Hazmat individual does not have to hear them all in real time—the Hazmat individual listens to the messages serially as the Hazmat individual retrieves them, and no message "walks" over any other due to multiple transmissions on the same frequency. Even more importantly, the user can prioritize the messages he or she wishes to hear first by assuming that message priority will approximate the identity of the user. So, for example, any radio user will preferentially retrieve the Incident Commander's messages first, in an emergency, due to the status and likely importance of the sender's message due to the sender's identity. Ironically, at this writing e-mail recipients use sender-based prioritizing all the time when reviewing e-mail messages, but the controllable, sender-based prioritizing (and at will reordering or selecting of) of radio messages is new to the present invention.

While it is certainly possible to bridge a great number of different frequencies together using this new technology, for the purposes of a nonlimiting example, consider an interoperability bridge for five frequencies:

(1) Incident Command;
(2) Police;
(3) Ambulance 1;
(4) Ambulance 2; and
(5) Fire First, look at a detailed list of the components and functions required of an ISI-Bridge63™: 1. One server (no Internet connection required); and 2. Five soundcards (one soundcard for each channel to be made interoperable). Next, look at the overall general functionality of the ISI-Bridge63™. 3. Using AVSR™, each frequency is associated with an ARMS™ (or Porta-Browser™) Folder. 4. Any registered or enrolled user can activate ARMS™ from any AVSR™ associated frequency. 5. Once activated, the user can send an ARMS™ message as:

a General Bulletin;
a message targeted to a group, e.g., "Ambulance 2;"
a voicemail;
an email (or SMS, MMS, ICQ, &c, assuming there is an Internet connection); or
any combination of the above.

6. Once the communication has been sent, AVSR™ associates the recipient or recipients with it or its soundcard, and causes a distinctive tone to sound on the recipient's or recipients' frequency. 7. The alert tone can be preceded by another user-configurable tone, such as may be required to activate a tone squelch or other system activation sound. 8. A short .mp3 or .wav recording may sound instead of the alert tone, for example, a recording saying "Message from the Incident Commander" (the recording may be digitally accelerated computer voice font, optimized for high speed intelligibility and distinctiveness). 9. The alert tone is specific, allowing the recipient(s) to identify by tone the identity of the sender. 10. The alert tone beacons on a regular basis, to ensure that it is heard despite other traffic that might be present on the recipient frequency. 11. Upon hearing the beacon alert, any recipient can activate ARMS™ and:

Retrieve the voice bulletin(s);
Retrieve the MDT™ E-text/email Bulletin (enrolled users only);
Retrieve voice messages;
Reply to voice messages;
Retrieve MDT™ E-text/email messages (enrolled users only); and/or
Reply to MDT™ E-text/email messages via MDT™ or voice (enrolled users only).

12. No Internet connection is required; if one is available, then electronic communications over the Internet are possible. 13. Users can also send and receive non critical messages, i.e., messages placed on the system by the sender as normal rather than priority. 14. Non-critical messages do not invoke the beaconing alert function. 15. For each frequency user's folder, whenever a new priority message appears, the computer alerts the frequency by beaconing to its dedicated soundcard. 16. Tone63™ data and data files may similarly be left and retrieved as voice messages, allowing data transfer, data storage, and data retrieval within the disaster scene. 17. Having multiple soundcards monitoring and beaconing to specifically assigned frequencies allows the system dynamically to work with any new or existing radio system (simplex, repeater, trunked, or other) that may subsequently appear in the disaster areas. 18. If a radio from the frequency or talk group user is available, then that radio is simply interfaced with the sound card. 19. If such a radio is not available, then a general coverage receiver may be substituted, if a suitable one is available.

... Use of Software Defined Radio. Ideally, there will be an SDR ("Software Defined Radio) associated with each sound card that can quickly be programmed to act as the frequency or talk group user using that channel, obviating the need for user equipment, or general coverage receivers (scanners). Because only the sender's channel is used during the send message stage, the use of scarce airtime is absolutely minimized. The recipient's or recipients' frequency is not used or activated until such time as there is a message waiting (which may be a request for information).

Because it is possible that the main ISI-Bridge63™ computer may be compromised, the system is designed to be self replicating. Even though no Internet connection is used, the various computers ("Nodes") self replicate in such a way that anyone has the capability of taking over the main control command functions when so directed. This is accomplished by interconnecting the nodes together by radio using Tone63™ (or comparable transmission) on an unused frequency. In other words, from time to time some or all the folders on a given computer may be transmitted via radio, and duplicated, on a separate computer.

In all the aspects of the present invention, not just the technology of this Part, any information or message posted and ready for receipt by a recipient may be "alerted" to the recipient by any audible, visual or other alert. Such an alert, without limitation, could be a beep or tone, or could be a speech prompt or any other audible or visual—or even tactile, such as a vibration—sensible event. (If future technology makes it possible, the alert could even be something the user could smell or taste.) The point of the alert is to make the recipient aware that there is a transmission awaiting receipt (so that, for example, one realizes one has an urgent message simply by coming in range of ones handheld transceiver after, say, clearing airport security). The alerts can be priority based, so that, say, only sender-based priority designated messages are alerted to the recipient. The alerts can be sender-specific, such as a message from the Incident Commander's being alerted to the recipient, on the frequency the recipient is monitoring, with a real voice or computer voice generated prompt that literally says, maybe even very quickly, "INCIDENT COMMANDER." After the message from the Incident Commander (or other sender by extension—this is a single nonlimiting example), the alert can be programmed to stop.

Part Four—a Method for Automatic Collection of Weather Data Using Tone63™ & MDT™ Nodes This is a proposal to automate the National Weather Service Skywarn weather data collection program by using advanced technology described herein. Using this technology, the National Weather Service can automatically receive high quality, filtered, screened, and formatted actual live weather reports without having to dedicate a forecaster or Amateur Radio Station Operator. This technology uses an automatic computer and cutting edge software instead, creating an "Auto-Attendant" for NWS Skywarn data.

Although the National Weather Service has access to some of the most modern technology available, for accurate weather reports, it still relies upon situation reports from people in the weather area. Advanced technology cannot always report actual ground conditions. Most National Weather Service "Warnings" are issued based upon reports from people rather than from projections from technology.

Obtaining and managing actual reports from people, however, creates problems and expenses for the National Weather Service. The NWS must assign a person to collect, filter, and evaluate the various reports to the exclusion of other activities.

Because the need for actual live reports is so acute, the NWS has adopted the strategy of obtaining reports in two general ways. In some cases, situation reports are solicited from a person in the affected area, using various techniques for identifying the person.

But a primary way that the NWS obtains live situation reports is through the "Skywarn" program. The Skywarn program is a system of trained weather observers who send in coordinated situation reports either by telephone or by Amateur Radio. Throughout the year, the NWS holds community training programs designed to qualify Skywarn Observers by training them how to observe weather phenomena, what weather reports the NWS desires, and how to report the observations by telephone or by Amateur Radio.

Amateur Radio is of particular assistance to the NWS because the reports going to the NWS office from Amateur Radio are very high quality. The reason that Amateur Radio weather reports are so high in quality is because of how the Amateur Radio community "filters" the situation reports of weather conditions.

Under the Amateur Radio community culture, radio usage and reports are almost always coordinated by a Moderator or Parliamentarian called in radio parlance a "Net Control Station [NCS]." The Net Control Station is a person that directs the usage of the frequency by recognizing operators, recording key reports, and requesting specific information using well-established radio parliamentary procedure.

Normally, when the National Weather Service issues a weather watch, trained Amateur Radio Skywarn observers begin to watch the weather and listen to the previously assigned Skywarn Amateur Radio frequency within the Amateur Radio band. When the NWS issues a Warning, then a Net Control Station will activate a Skywarn Net. The Net Control Station can be activated by the NWS (usually by way of a radio or cellphone call), or can self-activate (i.e., certain Amateur Radio Operators who frequently serve as Net Control can, on their own initiative, activate a Skywarn Net).

Once the Skywarn net is active, the Net Control solicits weather situation reports from the Amateur Radio Operators in the affected area. Some of these operators will be at home, but many will give their reports from their automobiles, as they pass through more or less weather activity.

The Net Control Station will invariably be a well-trained Skywarn Observer, and is fully capable of filtering the incoming reports. The Net Control Station will know what weather situations to report to the NWS, and which ones not to report (e.g., the NWS desires reports of rainfall in excess of one inch per hour, but not whether roadway surfaces have simply become wet). In some situations, the reporting Amateur Radio Operator will be over-eager to report weather information not desired by the NWS (e.g., wet roads), and the Net Control Station can suppress this extraneous data by not reporting it.

The information collected by the Net Control Station makes its way to the NWS office in one of several ways. In some situations, a NWS employee serves as the Net Control Station form the NWS's Amateur Radio Station, but this is an expensive and resource demanding undertaking. In other situations, a volunteer Amateur Radio Operator will contemporaneously travel to the NWS office and staff the station during the weather event. In both of these situations, the filtered weather data arrives to the NWS via radio through a person staffing the NWS's Amateur Radio Station.

More often than not, the Net Control Station is not located at the NWS office, so the filtered reports arrive at the NWS through either a NWS employee operating the NWS Amateur Radio Station, or by a call to a special telephone number at the NWS. In some cases, the Net Control Station emails the filtered reports to the NWS office.

The Skywarn Amateur Radio reporting system is an outstanding program, but is presently facing of number of specific problems. First, the proliferation of cellphone usage has caused a decline in Amateur Radio activities, and so there are significantly fewer Skywarn Amateur Radio Operators giving reports in the first place. Second, there has been a marked decline in the number of Amateur radio Operators who are willing and able to staff the NWS office during a weather emergency.

Therefore, the National Weather Service is receiving fewer and fewer filtered Skywarn weather situation reports from Amateur Radio Net Control Stations, and instead is relying more and more upon either unfiltered reports or specifically solicited reports, requiring more and more NWS human resources.

The present technology solves these two problems using a new, cutting edge, proprietary procedure, in an automated speech-recognition based solution.

For example, a weather emergency approaches. As the National Weather Service issues a Warning, the SAME (known in the art) signal activates numerous weather radios in the affected area. At the National Weather Service office, the Amateur Radio Station now includes (in addition to an aerial, feedline, and Amateur Radio) a computer and a computer/radio soundcard interface device. The computer, normally in standby mode, responds to the SAME signal, and activates both the computer and the Amateur radio.

Throughout the affected area, numerous Amateur Radio Operators both base and mobile, turn on their radios and prepare to send weather situation reports. An experienced Skywarn trained Operator takes the initiative and activates a Skywarn Net.

As the Amateur Radio Operators give their reports to the Net Control Station, the Net Control Operator carefully records the NWS reportable data, either onto his laptop computer or else simply onto a piece of paper.

When a significant reportable event occurs and comes to the attention of the Net Control Station, the Net Control Operator pauses the net, and briefly switches to the simplex frequency allocated by agreement to NWS reporting.

The Net Control Station now calls the National Weather Service's Amateur Radio Station, which has been equipped with the NWS Auto-Attendant and programmed using software to respond to certain words spoken over the radio by the Net Control Station. The frequency chosen may be any simplex Amateur Radio frequency, and might be on the Six-Meter band.

Once the software is activated by the Net Control Station, the NWS Station responds by asking the Net Control Station to "log-in." The Net Control Station (along with a number of trusted and active Amateur Radio Operators) have previously been entered as authorized users in the NWS Auto-Attendant computer, and the computer has been trained to recognize their voices.

Therefore, the Net Control Station may log-in, invoking advanced speech recognition technology or tone based or other data transmission such as Tone63™technology, and allowing the NWS Auto-Attendant computer to transcribe what the Net Control Operators says or to decode the Tone63™ digital file. The Net Control Station now reads over the radio on the simplex frequency the weather situation reports just collected over the Skywarn net.

If the Net Control Station recorded his reports on a computer, then the procedure can be a little bit different. Using the "Text Reading" feature of the system's product, the Net Control Station logs into the NWS Auto-Attendant Radio Computer using a computer voice, called a "data optimized voice-font". This is a computer generated voice that has been optimized to maximize its intelligibility to the receiving computers speech-recognition feature, and which has been extensively trained to allow for high speed, high reliability data transfer. In other words, the information read by the transmitting computer over the radio is transcribed with an extremely high level of accuracy and the NWS Auto-Attendant Radio receiving computer.

The NWS Auto-Attendant Radio computer transcribes—word for word—the filtered Skywarn reports, date & time stamps the reports, and stores them in html format on a "NWS Auto-Attendant" Browser Page (not Internet related) on the local computer. The NWS Auto-Attendant Radio computer may be remote, and itself replicated at any other location using Tone63™ or other data transmission as described above.

The NWS forecaster who desires to see these reports may access the reports at whim during the warning period or anytime thereafter in a number of ways. First, the forecaster may simply walk over to the NWS Auto-Attendant, click on one or more of the Browser page, and read or print the data from the browser page. Or, should networking be appropriate, the forecaster may view the page over the network.

After a preset time, the NWS Auto-Attendant Radio computer automatically stores all of the Browser Pages, clears the screens, and powers down the radio and computer.

As an automated APRS-based solution, and as an additional "add-on," the invention can interface the NWS Auto-Attendant program with the existing APRS system of automated weather reporting. This provides to the NWS Auto-Attendant a source of contemporaneous weather reports in the absence of commercial power, internet, and telephone service.

APRS, or "automated position reporting system," is a network of radios and Digipeaters which was initially devised to report (voluntarily) the location of an Amateur Radio Station. By using a GPS (Global Positioning System) receiver attached to an Amateur Radio transmitter, the Station's location is transmitted using packet radio.

APRS has the ability to transmit a small amount of additional data in addition to the GPS coordinates. A common use of this excess capacity is weather data.

The APRS system can therefore be a source of filtered weather situation reports. As an example, imagine that a local radio club (e.g., the Skyview Radio Society) has the necessary equipment to receive APRS weather data. An Operator reviews the APRS weather information, and extracts the reportable data. This filtered data is the placed into a file in preparation for transfer to the NWS Auto-Attendant.

The Skyview Operator accesses the NWS Auto-Attendant just as the Net Control Station does. The Operator transmits the filtered weather data by using the data-optimized voice-font. The NWS forecaster receives the filtered weather situation reports just as before.

Costs for the NWS Auto-Attendant include a standard Amateur Radio system (aerial, feedline, radio, power supply) which is often pre-existing. Added to the System are two devices: a standard desktop or laptop computer, and a computer/radio audio interface device. The only additional cost is the software.

Part Five—a Method for Transmitting, Managing, and Replicating Sensor Data Using Tone63™ & MDT™ Nodes There is a plethora of sensors covering thousands and thousands of square miles not only in the United States, but also throughout the world. These sensors measure everything from temperature and weather information to locations and seismic activity.

Despite being ubiquitous, it is nevertheless a grand challenge to obtain the data from these various sensors (which are often located in remote areas far from commercial power, internet, telephone, and cellphone services). Also, even when collected, there is no good way of organizing the data from multiple sensors in a way that can be easily viewed by a person needing the data. And finally, there is no good existing way to replicate the data collected at one point to a backup node located away from an area where the data collection point might be compromised.

This system solves the problems of sensor data collection and management by providing low-power sensor data acquisition, low-power data transmission, and replicable node-based data management in the absence of commercial power, internet, telephone, and cellphone services.

Here are the individual components of the Porta-Sensor™ system, and how Porta-Sensor™ works (imagine a sensor somewhere in a desolate location):

The Porta-Sensor™ uses a solar cell to obtain electricity from sunlight, and a simple charge controller to regulate the charge voltage and current to a battery of either NiMH or Pb cells, serving as a power sink. The same power source could be used to power the sensor itself.

Data from the sensor is intercepted by a self contained PIC (Programmable Interrupt Controller), and depending upon the character of the telemetry, is converted to simple numeric data by an EEPROM specifically flashed to convert the particular semantics of the sensor at hand.

The converted data from the EEPROM then excites a DSP (Digital Signal Processor) chip, which produces sound in the form of an optimized digital voicefont (E-Vox), consuming exceptionally little power to do so. Through this process, the sensor data has been transformed into a sequence of numbers and delimiters appropriate to the database form in use, and the sequence of numbers and delimiters (i.e., in the case of an Excel™ comma separated value worksheet, numerals and commas) has been converted to optimized speech in the form of an optimized data voicefont. In other words, the sensor data is now speech.

The speech generated by the DSP is absolutely uniform in character, and has an extremely limited vocabulary, i.e., numerals, possibly hexadecimal characters, and the database delimiter (probably a comma). The generated speech has also previously been used to train a speech-recognition program to recognize the optimized data voicefont. Because of the absolute consistency of the optimized data voicefont, and the limited extent of the generated vocabulary, the speech recognition software can recognize the generated speech at extremely high speed.

The speech generated by the DSP, being wholly within a standard audio bandwidth, is now coupled to a standard transmitter, modulated as either FM or SSB (depending on the transmission range required), and then transmitted on a frequency and at a power level appropriate to the range to the receiver.

The data collection point consists of a standard radio receiver coupled to a computer pre-loaded with speech-recognition software which has been especially trained to recognize the DSP optimized data voice-font. The signal received by the radio is a sequence of "spoken" numerals and delimiters, which are converted by the speech-recognition software back into their native data format, stored to the hard disk, and then are available for viewing by, in this case, Excel™.

This same data can be managed at the data collection point by using an html-based file system. The html system will not be connected to the internet under this example, but under appropriate circumstances it certainly could be. Browsers like Internet Explorer™ are ideal for data management, because they are readily available, and require little if any training to use.

The data collected from the sensor will have a unique identifier included in it when transmitted. This identifier not only identifies the sensor to the data collection point, but also signals the speech recognition software where to store the file. In this example, the file will be stored in a folder or directory previously established to be associated with the source sensor. The Excel™ file, readable as a "DDE" link to Internet Explorer™, is stored in that sensor's folder.

The previously established "website" has on its main page, in an organized way appropriate to the sensor net being viewed, links to the various sensors, which can then be viewed upon request. The end user can now see the data from the sensor, and no additional software nor training is required.

The system described can easily be replicated. The "Data Collection Point" is in reality nothing more than an aerial, a radio receiver, a computer audio interface, and a computer. There can be more than one data collection point ("Nodes") simply by having similar setups anywhere within the range of the sensors' transmitters. In the event that a primary node were to be disabled, another node can seamlessly take over the primary data collection duties. Thus, this system is not only simple, it is self-replicating.

As a first alternative, Porta-Sensor™ can operate using a system of tones (Tone63™) instead of the optimized data voicefont, as follows:

The converted data from the EEPROM will still excite a DSP (Digital Signal Processor) chip, which produces sound instead of speech, in the form of Tone63™, a proprietary QAM-FEC-based digital mode of communications using at maximum a 3 k audio bandwidth, consuming exceptionally little power to do so. In other words, the sensor data is now coherent, forward error correcting tones, being wholly within a standard audio bandwidth.

The data collection point consists of a standard radio receiver coupled to a computer pre-loaded with Tone63™-recognition software, which quickly & accurately discerns the data being transmitted, even under extremely adverse reception conditions, including dropouts.

This data can be managed at the data collection point exactly as described above, using the same html-based management scheme; the system here described can also easily be replicated.

As a second alternative, the Porta-Sensor™ system can operate using any power source. As a third alternative, the Porta-Sensor™ system can operate over any audio channel, either wired or wireless, including any available modulation scheme. As a fourth alternative, the Porta-Sensor™ system can send audio signal over non-traditional audio channels, such as string, wood, metal, and other vibrating materials. As a fifth alternative, the Porta-Sensor™ system can send audio over non-traditional audio modulation channels, such as modulated coherent infrared light, modulated coherent light, modulated incoherent light, and over any other medium that can be modulated at audio bandwidths.

Part Six—Power in Emergency Radio Communications

For a focused, effective, and rapid response to a regional disaster, the portable emergency radio communications operator must have clear strategies to obtain, transport, use, and replenish power. This Method describes just such an approach to power management.

The most elegant power source is the sun. Solar cells [most commonly amorphous silicon crystals] are efficient, rugged, and can be selected by considering parameters such as voltage, size, current, and weather worthiness. An emergency radio operator should select a cell with the capacity to replenish 1.5 times the usage of the radio equipment over a 5-7 day time period, under cloud cover for approximately 50% of the time.

The solar cell should be mounted in a weatherproof way, and where it will be exposed to the maximum sunlight or illumination possible. The solar cell can be mounted between glass, Plexiglas, plastic, Lexan, or any other sturdy clear material.

The connection to the charge controller should use large enough wire to overcome transmission losses, and should include fuses for over-currents, metal-oxide varistors for TVSS (transient voltage surge suppression), and gas-discharge tubes for fast-acting TVSS.

Because the solar cell produces unregulated voltages which can easily exceed amounts that can damage a battery, the power system uses a charge controller. The charge controller allows only proper charge voltages to reach the battery, draws its own power only from the solar cell, prevents insufficient voltages from reaching the battery, prevents excessive currents and voltages from overcharging the battery. A good charge controller will also monitor the state of charge of the battery, and will appropriately apply current or voltage as required for each of the four charging stages, i.e., Bulk (Constant Current, 14.2-15.0 VDC up to 80% Capacity), Absorption (Constant Voltage 14.4 VDC to 95% Capacity), Equalization (Constant Current (C10) to provide final 5%), and Float (Constant Voltage 13.2-13.6 VDC). The "State of Charge" ["SOC"] percentage can be measured by interrupting the charging process (for five to ten seconds every two minutes) to allow for sensing of the resting voltage. The "State of Charge" measurement is easily accomplished because there is a linear relationship between voltage and SOC [1.5V=100%; 0.15V=10%] for the preferred marine deep-discharge flooded lead acid battery.

The charge controller should consume minimum power, and should switch at appropriate flooded lead acid or sealed lead acid battery charge voltages. (The Sun-Systems Micro M+ is a preferred device.)

The charge controller should be properly fused and protected from lightning and transient voltages using gas-discharge tubes and metal oxide varistors.

Power from the solar cell should be stored in a "power sink," or a repository for electrical power. A marine deep-discharge flooded lead acid battery is preferred because of its high capacity, long life, compatibility with the charge controller, and ready availability.

To avoid the problem of acid spills or hydrogen leaks, the marine deep-discharge flooded lead acid battery should be regularly maintained, should never be exposed to charge voltages or currents in excess of its specifications, and should be enclosed in a waterproof, ABS-battery case.

Although many types of electronic equipment can be powered directly from a marine deep-discharge flooded lead acid battery, many cannot. Some laptop computers and radios require higher or lower voltages. To accommodate the varying voltage requirements that are likely to be met in the field, the emergency radio communicator should have an array of individual rechargeable cells, which can quickly be assembled to provide the requisite voltage.

An example of an excellent source of portable power suitable for most radios and most IBM portable computers is a battery of 10 nickel metal hydride cells. Now, individual cells are available in size "D" with capacities around 10 amp-hours each. A battery comprised of 10 such cells has an amazing 100 amp-hours of power at about 13 volts, easily rivaling an automobile battery in power, but in a much smaller package.

Another example of portable power suitable for most Dell portable computers is a battery of 15 nickel metal hydride cells. Now, individual cells are available in size "D" with capacities around 10 amp-hours each. A battery comprised of 15 such cells has an amazing 150 amp-hours of power at about 19.5 volts, exceeding most automobile batteries in power, but in a much smaller package.

The emergency radio communicator will require in the field a means of charging the various Portable Battery Packs assembled from the nickel metal hydride cells. Because the charging characteristics of these batteries are vastly different from flooded-cell lead acid batteries, the solar cell charge controller cannot be used without modification. Also, the need for a quick recharge of the Portable Battery Packs obviates the solar cell.

A rapid charger for the Portable Battery Pack can be constructed by using the marine deep-discharge flooded lead acid battery as a power source, and a charge controller. The charge controller should apply sufficient voltage to the Portable Battery Pack to charge the battery at a rate between 2 C and 5 C (two to five times to capacity of the battery), and should occasionally interrupt the charging process (for five to ten seconds every two minutes) to allow for sensing of the resting voltage. When the battery reaches Peak Voltage Detect ("PVD"—a voltage drop of 3.0} 5.0 millivolts per cell), also know as either "zero-delta V" ["0ΔV"](no change in resting voltage) or "negative-delta V" ["−ΔV"] (a 3.0} 5.0 millivolts per cell drop in resting voltage), the charge controller should switch to a C/64 charge rate (1/64 of the battery capacity), because the battery has reached its 90-95% "state of charge." Additionally, the device should have a temperature cutoff probe ("TCO") set to discontinue charging in the event that the battery reaches 104° F. (40° C.) to prevent damage to the battery. (The Triton Electri-Fly System is a preferred device.)

All DC connections should exhibit extremely low resistance, should be easily detached and re-attached, and should be color coded and polarized to prevent accidental reversed polarity connections. The emergency radio operator should keep at hand a collection of various power cords with a variety of DC connectors on one end, and a uniform DC connector on the other end, to allow powering unexpected devices. The collection of connectors should include alligator clips, banana plugs, bare wires, trailer style connectors, and an assortment of coaxial connectors in various sizes. The uniform DC connector can be a pressure fit device. (The Anderson Power-Pole System is a preferred device.)

Equipment Array of One or More Laptops & Radios

The power system that results from the thoughtful and careful application of these principles is extremely versatile and allows for extensive powering of an array of devices. For example, in the "hot zone" of an emergency situation, the operator may power from this system an array of portable laptop computers from different manufacturers (allowing instantaneous monitoring of transmissions), low voltage lighting, radio equipment, powered audio amplification, phantom-fed microphones, and related test equipment.

Battery Array of Varying Voltages

By arranging a battery of cells in such a way as to have access to the connections between the cells, it is possible to tap into the battery at different points, thereby drawing power from the battery at different voltages, to power the array of equipment where each device may require a different operating voltage.

For example, if the battery consists of 15 nickel metal hydride cells, the total voltage of the battery will be approximately 19.5 volts at a 100% state of Charge. By using a common ground, but instead tapping in at the tenth cell, the same battery will deliver not only 19.5 volts, but also 13 volts. Other tap points would result in differing voltages, with each cell providing 1.3 volts in multiples of 1.3, e.g., 1.3; 2.6; 3.9; 5.2; 6.5; 7.8; 9.1; 10.4; 11.7; 13; 14.3; 15.6; 16.9; 18.2; & 19.5, and etc.

The resulting battery pack should be covered with a material that accomplishes several different functions. First, the material must be strong enough to hold the weight of the battery. It must also be thick enough to prevent shorting of the connections, and it must be waterproof for field use. Also, the material must be thin enough to minimize the additional weight of the cover itself, and must be as thin as possible to minimize heat building that might occur in insulated containers. The cover must have a small zippered (in the alternative recloseable with Velcro™) pocket enclosing the battery itself, another small zippered (or the alternative) pocket for the power connectors, and a third similar pocket for a selection of additional power taps and connectors. Finally, the cover must have a sturdy handle for carrying, and a place to attach a clip, string, or other device to secure the battery during field usage. Ripstop nylon is a preferred material for the cover.

Because an array of different devices will be attached to the battery at different cell-points (to supply the correct voltage), and because the devices draw different amounts of current (e.g., a laptop computer draws more current than an emergency LED lighting device), attention must be given to a strategy to draw current from the individual cells as evenly as possible, to deter failure of the battery due to depletion of individual cells at disparate rates.

The solution is to draw voltages not from a single negative lead at cell 1, but from different cell-points, varied to balance the current draw.

Specifically, under this example, a Dell laptop computer requiring 19.5 volts would be attached to the array at the negative lead of cell number 1, and at the positive lead of cell number 15, the battery thereby supplying 19.5 volts to the Dell laptop computer.

Simultaneously, an IBM laptop computer requiring 13 volts would be attached to the array at the negative lead of cell number 1, and at the positive lead of cell number 10, the battery thereby supplying 13 volts to the IBM laptop computer.

The Dell laptop computer in this example is drawing power from cells 11} 5, and the IBM laptop computer in this example is drawing power from cells 1} 10. Therefore, cells 1} 10 are being drawn down faster than cells 11} 15.

Additional equipment should thus be attached to cells 11} 15 instead of further burdening cells 1} 10.

Simultaneously attached portable lighting equipment requiring, for example, 5.2 volts would be attached to the array, but not necessarily at negative lead 1. Under this example, the operator would select as a negative lead cell-point the juncture between cells 10 & 11, and would select as a positive lead cell-point the juncture between cells 14 & 15, accomplishing the dual tasks of providing the proper 5.2 volts (from 4 cells) and balancing the current draw.

Additional equipment would be attached to the array in a similarly balanced approach, resulting in a portable, solar powered, field regulated, field rechargeable, waterproof, heatproof, transient suppressed, fused, field configurable, balanced current, multiple voltage, power-sink based, included portable battery pack, multiple equipment array, high current capacity emergency radio and attendant equipment power source capable of supplying custom-tailored power to a wide array of field equipment.

Recap of Component Technologies.

The present invention is an array of electromagnetic implements that, singly or in combination, enable audio, analog or digital communications over short or long distances using low power and a narrow bandwidth of 3 KHz or less, preferably 1 KHz or less. Simplicity of an electromagnetic implement does not mean inferiority, in fact, many times the opposite is true. For example, to quote Jay Leno from May 13, 2005, after conducting a race between transmissions of cell-phone Instant Messaging and traditional Morse Code (CW), Mr. Leno said, "I'm sorry, Ben and Jason, you've been beaten by a 140 year-old technology." The array of electromagnetic implements is analogous to a field of surgical tools—the implements have novel and specialized functions themselves and they can perform synergistically together as well. In their optimum configurations and combinations, they create a new communications paradigm. These electromagnetic implements are selected from the group consisting of:

1. MDT™ or modulated data transfer—the use of voice and preferably high speed computer generated custom voice fonts (and digital signal processing) to send message or data transmissions including but not limited to HTML files;

2. PORTA-BROWSER™—a standard HTML, XML, or equivalent web page type computer screen display, preferably structured to reflect key features of the National Incident Management System (NIMS) and the Incident Command System (ICS), to provide an on-screen data interface interoperably transparent to all authorized users regardless of affiliation (police, fire, etc.);

3. ARMS™—hardware and/or software which embrace advanced voice recognition techniques to realize unattended voice message receipt, storage and delivery for any radio transmission (or any voice or data conveyance of any type);

4. QAMFM™—data transmission using a novel combination of the use of Quadrature Amplitude Modulation over a full quieting FM connection operating within a 3 KHz bandwidth using Forward Error Correction to achieve fast file transfer and disaster information management;

5. TONE63™—data transmission using a novel combination of the use of Quadrature Amplitude Modulation (QAM) over a full quieting FM connection operating within a 3 KHz bandwidth using Forward Error Correction and specialized vocabulary encoding to achieve even faster file transfer and disaster information management than QAMFM™;

6. Vocabulary encoding including but not limited to a) "term-of-art" and b) "fractal-algorithm-plus-vector" specialized vocabularies for data compression prior to transmission;

7. Infrared Mapping Interfaces—devices which transfer data from a source, such as a Personal Digital Assistant (PDA) or laptop computer to a radio transmitter able to send data therefrom; and 8. SSP™, or Shock-State Protocol—an on-demand communications re-deployment which, analogously to a human being in a state of shock and having restricted peripheral circulation, concentrates complexity near the heart of the system so that the radios, transmitters, and computers of the individual peripheral users can be as simple as possible—namely, whatever is available such as PDAs, laptop computers, FM or other simple handheld transceivers including typical walkie-talkies or if nothing else is available, tin can and string arrays. The tin-can-and-string idea is not counterintuitive when one realizes that notebook or laptop computers are utterly diverse—some have floppy drives, some have CD drives, some have infrared outputs, some are Wi-Fi enabled—yet they virtually ALL have sound cards and can thus generate audio transmissions for radio (or even tin-can-and-string) propagation. In the ultimate communications irony, the Shock-State Protocol which is especially suited to restoring emergency communications under adverse conditions is also especially suited to day-to-day use by individuals to manage communications according to a new paradigm.

Thus, taken alone or in various combinations, these electromagnetic implements create a paradigm shift in communications which not only enable interoperable emergency communications but which streamline and simplify communications in virtually every context.

Each of the above-described electromagnetic implements is discussed individually below, in the order listed above, followed by examples of how the implements can be used in real life communications systems both singly and in combination.

MDT™, or modulated data transfer, embraces the use of highly intelligible voice fonts, with a predetermined transmitting vocabulary, to send (convey) data to a predetermined vocabulary-recognizing receiver that transcribes the data using voice recognition software and digital signal processing for noise reduction. "Highly intelligible voice fonts" means that the voice recognition software at the receiver is able highly to distinguish the voice font, not necessarily that the voice font is highly distinguishable to the human ear (as empirically determined according to the parameters of waveform, "gender," "accent," pitch, speed, signal bandwidth, parametric equalization, and digital signal processing for noise reduction). Modulated data transfer is thus a way to convert data to an audio transmission that can be sent by radio and in turn transcribed by a computer at the receiving end of the transmission as the original data.

A non-limiting example of a useful MDT™ transmission is the sending and receiving of an HTML file from one computer to another by simple radio transmission. For example, if a computer network of any size is inoperable for any reason, a web page or other HTML or HTML-like data file which would ordinarily be sent over the network can be sent by a computer-generated voice's literally reading the file over a radio transmission, with the file's being transcribed at the receiving end. In one of its least sophisticated forms, the modulated data transfer would read characters and words in the HTML file, such as:

```
<html>
<head>
<title>Reported Medical Symptoms</title>
</head>
<body>
<!--updated 11 September 2006 at 16:44:13>
Sector -1- Symptoms: radiologic injuries
<br>
Sector -2- Symptoms: neurologic agent injuries
</body>
</html>
```

Typically, however, specialized vocabularies would substitute for individual character strings, to simplify the transmission of standard HTML character strings, such as

```
qq = "<html>"
qt = "<head>"
qo = "<title>"
qp = "</title>"
qs = "</head>"
qg = "<body>"
qj = "<br>"
qk = "</body>"
ql = "</html>"
qy = "<"
qa = ">"
qf = "</"
```

An MDT™ transmission is shocking to listen to the first time one hears it. A computer generated voice can speak extremely quickly—far more quickly than the human ear can decode (except to recognize the sound as extremely fast, albeit unintelligible, human-type speech). Within limits, voice recognition software is generally unhampered by the speed of the voice it is recognizing—voice recognition software needs to recognize the context of words and phrases along with the amplitudes and inflections of a given voice, not the speed of that voice. The benefit of using a computer generated voice, for MDT™ transmission and transcription, is that after the voice recognition software is trained to recognize the computer generated voice, the consistency of the computer generated voice assures extremely high reliability in the transcription by the voice recognition software. Notwithstanding this excellent match of properties (consistency of a computer generated voice and the complementary reliability of its voice recognition transcription), heretofore voice recognition software has to this inventor's knowledge never before been designed or intended for use to transcribe a computer generated voice, an opinion confirmed by the software developers of some of the major internationally known versions of voice recognition software. An MDT™ transmission can thus restore data communications between two computers with a simple radio (or other) interface via a transmitter at the transmitting location and a receiver at the receiving location. This means that MDT™ can "bridge" any link in any computer network when a simple radio (or other) connection from computer to computer can be established.

Voice-recognition software, and computer generated voice audio and computer generated voice fonts, are all already known in the art at this writing and are not described in detail here except to clarify that in the context of the present disclosure, the computer generated voice may take any form in which the computer generated voice or computer generated voice font may be registered by a computer sound card, regardless of whether the computer user can hear the voice at the time the sound card so registers it. In other words, when one uses a sound card interface, one need not hear the actual computer generated voice being sent.

MDT™ alone is a powerful tool. It is possible, for example, to transmit key data or lists from one location to another, using MDT™ and simple radios, when no other communications mode will work. Modulated data transfers inevitably work over 3 KHz, or even 1 KHz, bandwidths, using easily accessible HF, VHF, or UHF frequencies, whereas traditional data transmissions are "wideband" and thus typical of the power- and infrastructure-intense modes of the prior art. The initial data capture can be as simple or as sophisticated as is the equipment available under the circumstances. As one non-limiting example, the relief coordinator in a city experiencing a disastrous flood in only certain areas has urgent need of real-time data regarding the populations of relief shelters. In such a situation, with only certain areas' being unpredictably affected, some relief shelters will be overwhelmed with individuals' seeking relief while other shelters in lesser-affected areas would still be largely empty. Heretofore, in a communications emergency, when a flood has disrupted normal internet and telephone communications, the relief coordinator would have no easy way to receive real-time shelter population and related data. With an MDT™ transmission, however, the relief coordinator could request—and receive—shelter population data (or related information such as provisioning needs including food, water, pillows and blankets and emergency clothing supplies) quickly in a quick, simple, and efficient radio transmission. If the only way the shelter data could be initially captured and compiled were on a laptop computer, then the PDA or the laptop computer could be used as the basis of the text-to-speech computer generated voice font transmission by radio to the receiving computer. Data transfer by computer generated voice can take place at rates of about 400 words per minute or higher. Whereas a traditional emergency radio transmission of basic shelter data could easily take as long as fifteen minutes per page, consume valuable radio resources, and demand the full undivided attention of the sending and receiving emergency workers, therefore, with MDT™ the same page of data can be transmitted literally in seconds, virtually or completely automatically.

Modulated data transfer is by no means limited to emergency communications, however. The pioneering concept of using a computer generated voice as the basis for conveyance of data to a voice-recognition enabled receiving computer, regardless of the mode of conveyance by radio or otherwise, has applicability everywhere voice or data communications occur. For example, most people prefer to leave voice mail messages for others but to receive e-mail messages themselves, for the obvious reasons that speaking a voice mail message is extremely convenient to the sender while receiving an e-mail or other text message is the most convenient to the recipient. Modulated data transfer takes the seeming divide between spoken messages and text messages and obliterates the divide. In other words, modulated data transfer eliminates the distinction between a voice message and a data or text file—either can be conveyed as the other at the choice of the recipient by any means of any conveyance including but not limited to a simple radio transmission. Modulated data transfer can therefore form an important part of non-emergency telephone communications, wherein the voice mail messages familiar to all at this writing may be accessed by computer as text messages which closely resemble e-mail. To the knowledge of the inventor, this service does not exist and has not been proposed anywhere else prior to now. (Already available are text-to-speech services wherein one's e-mail may be read aloud by a computer, but the reverse has been heretofore unknown because converting a voice mail to an e-mail has until now been impossible.)

One reason why modulated data transfer according to the invention works as a ubiquitous voice-mail/e-mail/voice mail converter, whereas voice recognition software available at this writing has not accomplished the same thing, is explained as follows. The Achilles Heel of voice recognition software is and probably always will be the training of the software to recognize the unique voice of the speaker (user dependent). The available training protocols have recently improved greatly, so that many users of voice recognition software are now reasonably satisfied that the results obtained with their dictation of text are comparable to the results attainable by typing that text, and a long training period is not necessary. However, it is not foreseeable that there will ever be voice recognition software products in which the software need not be trained at all (except for brief, simple commands). This means that the use of a given voice recognition software product will likely never be able to transcribe messages (rather than simple commands) from any of a large population of human speakers without advance training.

Actually, using the following protocol, a given computer can transcribe a voice message or data file from virtually any human being—by telephone, radio, modulated laser beam, or any medium (or tin-can-and-string). This aspect of MDT™ requires the message sender initially to convert the spoken or text message(s) to a standard computer generated voice font (such as "Jessica" or one of many other standard voice fonts). For message receiving, then, virtually all laptop or other computers are also fitted or retrofitted with voice recognition software that is already trained to recognize and to transcribe one or more standard computer generated voice fonts and the sender also uses one of those same fonts. As of the applicable priority dates, no voice recognition software is known to have been trained to recognize a computer generated voice font—there was never a reason to do so and probably a psychological taboo applied—after all, the voice recognition software has always been intended to serve human speakers. The sender uses his or her own trained voice recognition software at the sender's own computer to convert the sender's voice into either a text file or a standard computer-generated-voice-font file—or both, using voice transcription plus "text-to-speech." When the computer generated voice is sent to the receiving computer, the receiving computer is already trained to transcribe that computer generated voice and does so with high reliability. The sender can send both a text message (via the usual text messaging routes) or can send the computer generated voice version of the message, or both, especially depending on the communications modes available at the time and whether the situation is standard (many modes available) or emergency (only emergency communications available). The receiving computer can retain the computer generated voice message as a voice message, convert it to a text message, or both.

As voice recognition software is further developed and compressed, therefore, individual telephones or other equipment such as cellular telephones (but see below) can thus be fitted with voice recognition software that turns the speaker's voice into a computer generated voice and which computer generated voice can in turn be transcribed by any receiving computer. By the use of MDT™ in this way, therefore, there is no longer any distinction between voice mail and e-mail—one can be the other or vice versa at the complete control of the message recipient as long as the message is sent in the first place by computer generated voice font.

The implications of the above are profound in the context of those 3,000 daily messages everyone struggles to manage. One does not need a crystal ball to see that message senders will soon realize that if they send their voice messages in transcription-capable computer generated voices, the likelihood of their messages' attaining a high level of attention will be greatly increased vis-á-vis traditional voice mail messages. As senders quickly transition to the use of computer generated voice messages to send voice traffic as well as data files—because MDT™ is effective for both data and voice conveyance—recipients will routinely receive readable texts of all their messages with no human intervention's having been necessary. Moreover, because one might not want to be too aware of the conversion of one's voice to a computer generated voice for the purpose of sending an interconvertible voice mail/e-mail message, the voice-font conversion may be programmed to be opaque to the user if desired.

With all incoming messages to a single computer having been rendered as data-mine-able text after voice-recognition transcription, moreover, for the first time a single recipient computer can be provided with a true automated attendant function comparable to a personal assistant who has known one for years. Messages received as text files can not only be visually arrayed but can be organized according to the recipient's pre-programmed prioritization instructions. For example, individuals whose communications are of a priority nature, such as those of family members and work superiors (or, in the case of emergency operators, government officials), can be prioritized by the automated attendant ahead of or at least separate from messages from co-workers or other pre-ranked data sources. The return of the function of "prioritizing callers," so common in upper-class Victorian life yet obsolescent today, is in urgent need of full restoration and modulated data transfer plus a virtual or automated attendant accomplishes it. If we are to become more than communications primitives, every one of us needs a ready electronic capability to sort and to prioritize our incoming messages before we even see them. Without the ability to prioritize our messages according to an individual pre-program, we will never be able to receive the most critical messages first or be able further to manipulate and disseminate the information we receive without devoting too much time to organizing that information in the first place. Receiving text messages according to the above-described discretionary control is as important to each of us in our daily lives as the same capability is critical to any emergency communications officer in a regional or national emergency.

A few specific examples of what MDT™ can do are listed here, but the list is non-limiting. MDT™ may be used: to make voice-activated "phone patch" telephone calls through a local radio repeater; to send voice mail messages via "phone patch" to a recipient's voice mail; to send e-mail to a recipient's computer via the user's computer either directly or remotely; to send a single voice transmission which becomes, at the same instant, an identical voice mail message and e-mail message to the intended recipient; to form a network of "bucket-brigade" communications in which a populace of individual MDT™ users can rely on one another as individual network nodes to reconnect themselves collaboratively to an area outside the affected region in an emergency; and to provide three types of remote operations, namely, remote access to information; remote access to computing power and remote access to other communications. These three remote accesses are described in the following paragraphs.

Remote access to information is possible with MDT™ because MDT™ can manage HTML, XML and similar languages both as transmission and reception. When websites, computer libraries, internet material, electronic files, electronic databases, and dynamic libraries are fitted or retrofitted with the text-to-speech capabilities of voice recognition software and can convey same by radio or other means, individual computer users can request transmissions of the contents of those websites, computer libraries and etc. and transcribe them with their own voice recognition software. The flexibility of such a system cannot be overstated—multiple MDT™ users can bridge any geographic network connection to such information as they choose by transmitting and retransmitting MDT™ files without reliance on pre-existing radio repeaters or any hard wired infrastructure at all. Examples of remote access to information are: finding a street address by speaking into an HT radio and receiving a computer voice font transmission of the address; finding an individual's location by speaking into the HT and retrieving the individual's GPS report (under APRS, Automatic Position Reporting Service), transmitting a request for and receiving a computer voice report from a web site; finding the blue book value of an automobile in real time; finding an alternate route in a traffic jam; finding weather or wind information; sending or receiving emergency photographs; finding airline flight information; determining one's location when lost; or determining weather in a remote city. Requests for this information may be made in the user's own voice, as translated into a computer generated voice font by the voice recognition software; receipt of the information may be received as a voice transmission, an e-mail, or both.

Access to computing power is achieved because voice recognition technology has obviated the need for keyboard and "carpal tunnel syndrome activator" (mouse) control of computers. Using MDT™, any computer can be human-controlled over any distance using simple analog radio waves (or even the telephone if it happens to be working). A user whom in the past might have carried his or her laptop computer home for the weekend need not even carry it, if the user can govern it with MDT™ from a radio or telephone. For example, a physician can call her computer from home, using MDT™, and not only dictate customary physician's notes using voice recognition software but in turn instruct the computer to transcribe voice messages and to rebroadcast them as text-to-speech transmissions, thus sending e-mail anywhere in the world simply with a telephone or radio call to the office. This also means that any other imbedded computers—in the car, refrigerator, boiler room or vacation house—may be controlled remotely as well. The key to understanding remote computer power is to realize that one's own voice, when transcribed as text by one's own computer and then rebroadcast in a computer generated voice font, immediately becomes a data transmission which can in turn control any further computer to which connection can be established. Additionally, input to voice recognition software via a full quieting FM transmission through a soundcard or USB audio pod interface produces a greatly higher, and therefore more intelligible, signal to noise ratio beyond that obtainable with the current practice of using a noise-canceling or transcription microphone attached directly to the soundcard or USB audio pod. Examples include without limitation: operating a radio net from remote location; starting a computing project at work from home after hours; repairing a computer in a remote location without having to travel to it; sending data and digital assistance to a pilot whose computer is in trouble, by remote transmission; remote direction of calculations of casualties/refugee densities in an emergency in order to calculate (again remotely) deployment of emergency relief and supplies; or cooperation and intervention by a doctor or surgeon in a remote location with respect to computerized equipment such as a heart lung machine or other computerized medical equipment.

Access to other communications is achieved by creating computer generated voice font access to any other computer- or electronic-based communication technology, such as e-mail, voice mail, SMS, IM, MMS, ICQ or any other conceivable technique. As above, the key to understanding remote communications access is to realize that one's own voice, when transcribed as text by one's own computer and then rebroadcast in a computer generated voice font, immediately becomes a universally recognizable data transmission which can in turn control any further computer to which connection can be established, including the receipt and/or transcription of comparable return computer voice font replies.

In summary, then, MDT™ is a blended method of analog and digital techniques which allows for the transfer of digital material over simple analog radios by modulating and demodulating the digital material using sound, speech and voice recognition. MDT™ turns the data transfer world on its head by translating digital data to simple words and characters that can be read by a computer, transferred over analog radio systems, and then reconstructed by the recipient computer. MDT™ is thus a minimalist technology that allows for a complex data transfer over extremely simple communications systems. MDT™ makes computer information, computer usage, and electronic communications uniquely compatible with the human voice and human control.

By way of clarification, according to the new communications paradigm described herein, MDT™ is best used with the simplest equipment as possible being in the hands of the actual user. "Ear buds" and other simple equipment (even "dumb terminals") are optimally used to interface with computers in which voice recognition software can function for all (previously registered) users, as discussed further below in connection with the "Shock-State Protocol." Similarly, "ear buds" or dumb terminals can be used to interface with one's own personal computer. This means that by voice or simple typing control, a human user no longer has to learn endless complicated functions of multiple devices, i.e., cellular telephones, PDAs and etc—because the user has learned to interface with one device only, namely, the single personal computer. Having said that, though, in addition to this paradigm shift, MDT™ is also useful under the old paradigm to facilitate traditional voice communications to convert them at the sender's computer to computer voice font transmissions capable of greater versatility upon reception. If this means that an individual's cellular telephone or PDA—as well as personal computer—is retrofitted with voice recognition software to transcribe the user's voice and in turn to turn text-to-speech for further conveyance, so be it. In its broadest form, therefore, MDT™ embraces all applications of the use of computer generated voices to transmit (or to convey) any sort of message or data by any means including but not limited to radio, and the concomitant use of voice recognition software to transcribe the transmission.

MDT™ is thus a particularly powerful tool when combined with a PORTA-BROWSER™. A PORTA-BROWSER™ may or may not always embrace the automated attendant function as described above, but will always comprise a standard HTML or equivalent web page type computer screen display for coordinating a plurality of messages and data files. In one preferred embodiment pertaining to emergency communications, the screen display is structured to reflect the features of the National Incident Management System (NIMS) and the Incident Command System (ICS), to provide an on-screen data interface interoperably transparent to all authorized users regardless of affiliation (police, fire, etc.). In other words, PORTA-BROWSER™ is a master computer screen display (via common browser programs such as Internet Explorer or Netscape) for communications such as emergency communications, and can have limited or unrestricted access depending on the circumstances. PORTA-BROWSER™ in its most expansive applications can be accessed by ANY personnel, not just emergency personnel. The screen can be refreshed as often as every few seconds to provide updated information. In a standard web-page type set up for emergency personnel use, different subpages would be dedicated to police, fire, emergency medical personnel, etc. etc., respectively, so that everyone involved in the communications knows where to look for their own updated information. Likewise, those who are authorized to do so may post updated information themselves by transmitting data to be included on the refreshed PORTA-BROWSER™—possibly by a modulated data transfer transmission.

A sample PORTA-BROWSER™ in an emergency setting may be particularly understood as follows. Whereas police, fire and etc. could not heretofore interoperably communicate on their own unique voice radio frequencies, they can all interoperably communicate if they all have access to a web page or a web-page like display in which certain areas of the page are dedicated to the various police, fire and etc. personnel. As everyone knows, when electronic computer communications work they are much faster and more efficient than voice radio communications ever are. Therefore, a PORTA-BROWSER™ is a web page or web-page like computer screen display in which various regions of the page or computer screen are allocated to service-specific communications, with other general information areas which are pertinent to all. The regions may be divided-screen regions on a single screen display or may be web page "subpages" on a multiple of interrelated screens accessible with thumbnails or bookmarks, or any variant of either. The idea of a PORTA-BROWSER™ accommodates the need for information to reside in an available state for consultation as needed—a luxury never before available when only real-time voice communications were used for police, fire and etc. The PORTA-BROWSER™ also accommodates the reality that much of the information of interest will be pertinent to all: chemical spill locations; volatile components; prevailing winds; transportation bottlenecks; locations of fires and floods; and many more features of regional and national emergencies. These features of interest to all certainly need not be duplicated on a number of different emergency communications services. Individual incoming data is managed and posted on the PORTA-BROWSER™ by what under the prior art radio system would have been called a "net control:" incoming information is triaged and posted where it needs to go, without overwhelming the PORTA-BROWSER™ content with so much text that no one can find the critical information they need. As another example, the radio-dispatching function of a police radio is dedicated to a particular area of a PORTA-BROWSER™ page, so that anyone consulting the page can see to where individual personnel have been dispatched. For the police dispatch area of the page, clearly access would be limited to authorized personnel using the proper encoding and decryption, etc. An automated attendant function is optional but also contemplated, in which the routine functions of fire, police and etc. reporting can be handled automatically while a net control continues the judgment-based communications (dispatching, capture of sensitive data from injured or security-compromised personnel, etc.).

A more complete nonlimiting illustration of how a PORTA-BROWSER™ may be used appears in the following paragraphs. As can be intuitively appreciated, when one revamps emergency communications so that a number of services all share a single computer screen display protocol, such an innovation amounts to a novel overall method as well as just the PORTA-BROWSER™ screen display which supports the overall system. The ensuing paragraphs thus describe a "Method" that constitutes a single non-limiting explanation of one overall system within which a PORTA-BROWSER™ has particular utility. Although the Method concentrations on emergency personnel equipped with PDA type computers, the Method may be analogized to personnel having laptop computers, notebook computers, or laptop or notebook computers which are Wi-Fi enabled, or any other computerized devices which can in turn form the basis for data capture and transmission. When the computer equipment according to the Method has speakers or cables and sound cards to support it, all the communications referred to in the Method as supportable by Infrared Transmission from a PDA may alternatively be sent by MDT™ instead.

The Method is an invention for coordinating, organizing, training, and drilling qualified first responders, critical personnel, and other tactical emergency workers in effective procedures before, during, and after an emergency for reliable radio communications.

The Method includes a means for coordinating an existing organization of emergency radio communicators.

The Method consists of five discrete stages:

I. Coordinate & Activate the OES System—Amateur Radio Operators who are members of the American Radio Relay League (ARRL) may be appointed as an Official Emergency Station (OES) by their Section Emergency Coordinator (SEC) or Section Manager (SM) at the recommendation of the EC (Emergency Coordinator), or DEC (District Emergency Coordinator if there is no EC) holding jurisdiction. The OES appointee must set high standards of emergency preparedness and operating. Currently, the OES system is extremely sound in theory, but in practice is not well coordinated, and in many jurisdictions is not activated in any meaningful way. The Method identifies that the reason the OES System is not well organized is because there is no existing method available to coordinators to employ to coordinate and to activate the OES System.

A Accumulate appropriate technical information—In order for the OES system to work effectively, it is essential to gather certain technical information that will be used to allow interoperability of the OES system not only with itself, but also with the Amateur Radio Emergency Service (ARES) and other relevant governmental and non-governmental agencies.

1 Geography—The geographic size of the OES System under development is critical to know in order to choose appropriate operational frequencies that will cover the region under varying propagational conditions. Most OES Systems will be coordinated at the ARRL "Section" level, described below. The Section's geography should be well-understood.

2 Demographics—The demographics of the Section's radio operator population is important to understand the varying socio-economic groups that may exist and that may interface with the emergency radio communicator or OES operator. The OES should be familiar with local language, usage, slang, and regional linguistic abbreviations.

3 Propagation—Some regions are far more prone to certain propagational devices (such as auroral curtain propagation in northern latitudes and sporadic E propagation in mid latitudes), requiring more specialized frequency choices. Other regions have buildings, mountains, lakes, foliage, and other terrain affecting propagation. The OES frequencies should be selected to account for each of these variables.

B Accumulate information about the structure of the ARRL/OES System—The Official Emergency Station (OES) program is administered by the American Radio Relay League (ARRL). A full understanding of the ARRL structure, and how the OES program fits within it, is essential in order later to interface the OES system with the relevant governmental and non-governmental agencies.

1 What is the ARRL?—The American Radio Relay League is a non-profit "national membership association for Amateur Radio operators. The seed for Amateur Radio was planted in the 1890s, when Guglielmo Marconi began his experiments in wireless telegraphy. Soon he was joined by dozens, then hundreds, of others who were enthusiastic about sending and receiving messages through the air—some with a commercial interest, but others solely out of a love for this new communications medium. The United States government began licensing Amateur Radio operators in 1912. By 1914, there were thousands of Amateur Radio operators—hams—in the United States. Hiram Percy Maxim, a leading Hartford, Conn., inventor and industrialist saw the need for an organization to band together this fledgling group of radio experimenters. In May 1914 he founded the American Radio Relay League (ARRL) to meet that need. Today ARRL, with approximately 163,000 members, is the largest organization of radio amateurs in the United States."

2 Structure of the ARRL—The ARRL is divided into 15 Divisions, each led by an elected Director and Vice-Director. Each Division is further divided into administrative Sections. There are 71 Sections in the United States. Each Section is led by an elected Section Manager, and by various other appointed persons. The ARRL structure is known in the art.

3 Identifying the ARRL Jurisdiction—The ARRL divides the country into regions of exclusive geographic jurisdiction. Because most emergency organizations will not adopt the same geographic divisions, the OES must be aware of nearby ARRL jurisdictional information. The ARRL Divisions and Sections are known in the art.

4 ARRL Field Services—"The Field and Educational Services Department (F&ES), formed on Jan. 4, 1999, combines the responsibilities and resources of the Field Services, Regulatory Information, and Educational Activities departments (arrl.org)." It is this department of the ARRL that sponsors the OES program.

5 Leadership of the ARRL—The current leadership is well identified in the ARRL publication "QST Amateur Radio," and also appears with the organizations' website. This Method requires that the current information be kept in an updated database available to the OES during times of power and propagation failure.

6 Contacting ARRL leadership—Under this method, the ARRL leadership is contacted by Amateur Radio "nets," by email, and by personal contact at "hamfests" and other Amateur Radio events.

7 Becoming involved in ARRL leadership—Like many institutional organizations following the advent of television, the ARRL frequently has unfilled leadership positions. While most emergency communications positions are quickly filled due to high interest, the ARRL is extremely consistent in recruiting high quality, competent leadership. As in many organizations, appointments frequently precede elected positions.

8 ARRL appointment processes—ARRL appointments are generally made by the Section Manager, upon the recommendation of the SEC, DEC, and EC. The OES is appointed by the SM or SEC, or upon recommendation of the DEC or EC. Appointments are most quickly announced through an extensive online broadside program, on the Division or Section website.

9 Accumulate detailed contact information—In order to coordinate the activation of the OES system, each OES will require detailed ARRL contact information. This Method requires that the current information be kept in an updated database available to the OES during times of power and propagation failure.

C Accumulate information about local operating practices—Much of the details of local operators, propagation, and activities will be found by listening and participating in local radio events. Different areas have differing local operating practices and etiquettes. This Method contemplates that the OES System will have detailed knowledge of local operating practice.

1 Section Emergency Plan—A first place to find local practice is the ARRL/ARES "Section Emergency Plan." This Method places a copy of the Section Emergency Plan on the OES's PDA for ready retrieval.

2 Band Plans—Although Amateur Radio has only a small number of mandatory Band Plans (suggestions for certain operating modes on certain frequencies), most Amateur Radio operators voluntarily adopt more broad national Band Plans promulgated by the ARRL. Additionally, many local areas informally adopt additional local Band Plans.

3 NVIS HF Frequencies—Local High Frequency (3-30 MHz) operations are usually conducted by ground wave. More regional HF communication often occurs by Near Vertical Incidence Skywave ("NVIS"), the equivalent of bouncing the radio signals almost vertically off of the ionosphere. The Method requires proper selection of a frequency for region-wide NVIS propagation, and so the local NVIS activity must be well understood and recorded on the PDA Database, including:

a Definition—Near-Vertical Incident Skywave ("NVIS") is a theory of radio propagation using F-Layer atmospheric refraction around 65° to 90° enabling low-power local and region communications within a radius of 300 to 400 miles.

b System Concept—NVIS should be viewed as a system, in the sense that stations which are similarly equipped will be able better to communicate within the range of the system. The system consists of the NVIS antenna, and the operator's knowledge, skill, and experience.

c History—NVIS antenna systems were pioneered by the Germans in WWII, and were known as "rail" or "cage" antenna. NVIS systems were widely used by the US forces in Vietnam. NVIS is now being studied, promoted, and deployed by ARES and other emergency communicators for use in terrain where line of sight V/UHF communications is not possible.

d Range—NVIS systems have a reliable range within a radius of 300 to 400 miles using low power (5-100 watts) transmitters.

e Power—NVIS systems should be limited to 100 Watts, because more power frequently causes increased groundwave, resulting in phase-distorted reception issues.

f Antennas—NVIS antennas are usually low wires or loaded whips, mounted horizontally, less than ⅛th W in height. A typical NVIS system will include two dipoles (80-Meters @ 121 feet & 40-Meters @ 65 feet) mounted at right angles about ten feet above the ground.

4 Local Two-Meter Nets—A tremendous amount of radio communications occurs on the Two-Meter Repeaters, which often have ranges of a radius of 150 miles or more. Much ARES activity occurs on Two-Meters. The Method requires that known ARES nets on Two-Meters be understood, recorded on the PDA Database, and that the OES participate actively in these activities.

5 VHF digital/phone—The Method requires that the OES also record and be familiar with other VHF activities, including Single Sideband (SSB) simplex activities, and VHF digital and data activity.

6 UHF Digital/phone—The Method requires that the OES also record and be familiar with other UHF activities, including Single Sideband (SSB) simplex activities, and UHF digital and data activity.

D Identify & accumulate information about OES participants—The Method next requires that information about the OES Operators be accumulated, not only to assess the Operator's capabilities and skills, but also to be able to contact the OES Operator as needed in an emergency. FIG. 2 shows the details of what essential information is required by this Method.

E Activate the regional OES System—The Method next activates the local or regional OES network, already known in the art.

1 Determine who are the OESs in Western Pennsylvania—Generally speaking the information identifying the OESs in a given area is collected by the Section's SEC or ASM, and will usually be available to the SM as well. The ARRL is attempting to centralize this information in a more comprehensive contact list.

2 Form an OES Database—FIG. 2 shows the details of what essential information is required by this Method.

3 Recruit active OES participants—Competent, interested, and motivated potential OES Operators can be identified by asking the SM, ASM, SEC, and ECs, listening to active participants in ARES & RACES nets, attending hamfests and discussing the issues with others in attendance, and by contact with local EOCs.

4 Provide any needed training for OES Operators—Some OESs will require additional training; this is specified in detail below.

5 Define an OES Reflector for Western Pennsylvania—An excellent tool for disseminating routine information and encouraging discussion is a "Yahoo Group," an email reflector.

6 Establish an OES Repeater Net—Various ARES, RACES, and Public Service nets (usually acting on the Two-Meter Band) 'rotate' their NCS (Net Control Station), and the OES System should, on occasion supply an operator to serve as NCS.

7 Establish an OES HF/NVIS Net—Within the region or Section, reliable HF communications (on different frequencies for day and night) can be established and practiced on the various HF Bands, and the OES System should be well-versed in these techniques.

8 Establish an OES Simplex Operational Net—OES operators should experiment with and be well aware of what frequencies can be used to contact other particular OES operators in their area, and in nearby Sections.

9 Establish Wormholes via Echo-Link®—Echo-Link® is a superb mechanism for establishing local, regional, and worldwide wormholes in the internet through which OESs can communicate and link their communications. Echo-Link® operates in one of four Modes (Single-User, Sysop, Simplex Link, and Repeater Link). Each Mode can operate as a Node, of which there are four types, scil., User Node, Repeater Node, Link Node, and Conference Server Node.

10 Establish an active digital OES capability—Amateur Radio has always pioneered new modes of communications, from the original digital mode (Morse Code) through the Spread-Spectrum technologies (invented in World War II, but now forming the basis for trunked and cellphone systems today). This method requires that the OES operators be well-versed in the premiere and most effective digital modes for emergency communications, permissible under FCC Rules (see §97.309a4), and these include:
  a Packet—Generally speaking, packet is a mode designed to interconnect computers using radio rather than wires or fiber optics. Packet is a well-established, well-defined, and efficient communications mode, especially for V/UHF.
  b Pactor—PACTOR has developed from a combination of the newer 'PA'cket radio and the older 'AM'ateur 'T'eleprinting 'O'ver 'R'adio (AMTOR) mode. Pactor is a synchronous mode.
  c PSK-31—This digital mode is designed for keyboard to keyboard communications, and closely resembles Instant Messaging.
  d Wi-Fi—A digital mode of particular interest is "Wi-Fi," also known as "Wireless Fidelity."
    i Wi-Fi refers to the wireless network use of the "802.11" protocols (numbered 802.11 by the IEEE in 1996) in the unlicensed 2.4 and 5 GHz radio bands. "802.11a" refers to a data rate of 54 Mbps, "802.11b" refers to a data rate of 11 Mbps, and "802.11g" refers to data rates in excess of 20 Mbps.
    ii Both laptop computers and PDAs can be "Wi-Fi enabled," meaning that they can send and receive data wirelessly from a "Wi-Fi Access Point," or "hotspot," with an average range of about 300 feet.
    iii The Wi-Fi 802.11 protocols operate within the Amateur Radio bands, and a qualified Amateur operator or the OES System can establish a high-power hotspot, enabling Wi-Fi equipped laptop computers and PDAs within a large area.
    iiii After "lighting-up" Wi-Fi within a disaster area, the OES System can link the Wi-Fi data by digital radio to another OES outside the disaster area who still has internet access. The internet-equipped OES can link the radio-transmitted Wi-Fi data to the internet, thus restoring internet access to the disaster area even in the absence of power, telephone, and cellphone service.

11 Infrared Device—The Method includes the use of a new device, developed as part of this method, for interfacing Amateur Radio Equipment with PDAs, described as follows:
  a PDA Infrared Capabilities—PDAs operate ubiquitously with infrared file transfer capabilities.
  b Amateur Radio Data Capabilities—Most modern Amateur Radio Equipment (and other similar communications equipment) are capable of transferring data over the airwaves by use of a data port.
  c Infrared Transducer Needed—What has been missing in enabling Amateur Radio equipment to be operated by or to communicate with is an infrared interface device.
  d Control By Serial/USB—Amateur Radio equipment readily interfaces with PDAs using either a serial port/USB interface, but file transfer requires specialized cables, and no file transfer software exists.
  e Control By Infrared—This Method uses a custom made infrared interface between the Amateur Radio and the PDA using standard "iR" protocols (understood by the PDA) which are translated by the device to standard "CAT" commands (understood by the Amateur Radio), used to control the radio by the PDA.
  f File Transfer Via Infrared—This Method uses a custom made infrared transducer interface between the Amateur Radio and the PDA using standard "iR" protocols (understood by the PDA) which are translated by the device to standard audio modem sounds (understood by the Amateur Radio), used to transfer electronic data from the PDA to the Amateur Radio and then over the airwaves, and visa-versa
    g Advantage of Infrared—The advantages of using an infrared interface are that this Method and device: (1) are ideally suited for low power operations, since no computer is required; (2) large amounts of data accumulated by the PDA may be sent over the airwaves without much battery consumption, and without the use of commercial power; (3) large amounts of data received over the airwaves may be transferred to the PDA, viewed, further transmitted PDA to PDA by infrared, and printed without the use of commercial power; (4) images accumulated by the PDA may be sent over the airwaves; (5) no specialized cable is required for connection to the PDA; (6) various PDAs and Amateur Radios may be used without special configuration.

F Train—Some OES Operators may desire or require additional training in the non-voice modes, and in certain operating techniques. This Method requires competency in the following fields:
  1 ARECC—The ARRL, in conjunction with a number of private companies, foundations, and grants, sponsors a training program called Amateur Radio Emergency Communications Course, (ARECC). This three-level course is ideally suited for the initial training of the OES operator.
  2 Legalities of Emergency Operations—Although usually tightly regulated, use of the radio spectrum during an emergency is somewhat relaxed. Legalities of emergency operation are known in the art.
  3 Net Operation—Because actual practice in structured Net operations is one of the better training devices for emergency communications, the Method contemplates that all Operators will participate in formal Nets, not only by checking in, but also by service as NCS (Net Control Station) on a regular basis.
  4 Incident Command System—The National Interagency Incident Management System (NIIMS) based Incident Command System (ICS) is a public domain, standardized response management system, forming an "all hazard—all risk" approach to managing crisis response operations as well as non-crisis events. NIIMS was originally designed by a group of local, state, and federal agencies with wild-land fire protection responsibilities, to improve the ability of fire forces to respond to any type of emergency. NIIMS consists of 5 major subsystems that collectively provide a total systems approach to all-risk incident management. These five subsystems are: Incident Command System, Training, Qualifications and Certification, Publication Management, and Supporting Technology. This Method adopts ICS because it is nearly ubiquitous in emergency communications.

5 Message Handling—At the heart of message communications is the ability to convey information concisely, accurately, and quickly. Many standardized message handling routines exist, all designed to minimize the injection or errors into handling messages, or "traffic." This Method adopts the ARRL standardized message handling technique, because it is well known and proven effective. OES Operators should expect to handle Emergency traffic, Priority traffic, Welfare traffic, and Routine traffic.
 a Emergency Traffic—Emergency traffic concerns messages having life or death urgency, and include such matters as requests for assistance, requests for critical supplies, official instructions to provide assistance, and other critical signed official traffic.
 b Priority Traffic—Priority traffic concerns important or time critical official messages to, from, or related to a disaster area, or alerting the presence of death or injury. Examples include information and directions conveyed from officials by their radio equipped "shadows," inter-agency orders, and logistical directions.
 c Welfare Traffic—Welfare traffic, also called Health & Welfare traffic, concerns inquiries between people in the disaster area and their friends and family outside the disaster area.
 d Routine Traffic—Routine traffic concerns messages that are not emergency, priority, or Welfare traffic, and though seldom seen during a disaster, are commonly used during training and drilling exercises.

6 Digital Traffic—The OES may be called upon to transmit a variety of digital messages. The OES Operator under this Method should be trained in handling digital traffic such as:
 a Instant Messages—This Method trains the OES Operator to be able to send "IMs" over Amateur Radio in a variety of ways, including PSK 31, Pactor, and Packet.
 b Email—This Method trains the OES Operator to be able to send Email over Amateur Radio by Pactor and by Packet.
 c File Attachments—This Method trains the OES Operator to be able to send file attachments to email over Amateur Radio using Pactor and by Packet.
 d Media (Images & Sounds)—This Method trains the OES Operator to be able to send media file attachments to email over Amateur Radio using Pactor and by Packet.

7 Digital System Interfaces—This Method contemplates that a significant means of obtaining information from a disaster area is by enabling or empowering existing communications systems that may have been incapacitated by the disaster.
 a Wi-Fi—The OES Operator is trained in interfacing the Emergency Station—perhaps by way of setting up a portable emergency station—with Wi-Fi-equipped laptop computers & PDAs using an interface card between the OES radio and portable computer, a resonant antenna deployed at maximum Height Above Average Terrain ("HAAT"), and RF amplification.
 b Cellphones—Similarly, the OES Operator is trained in interfacing the Emergency Station—also by way of setting up a portable emergency station—with cellphone within the range of the OES location, using an interface card between the OES cell-compatible radio & the OES portable computer, a resonant antenna deployed at maximum Height Above Average Terrain ("HAAT"), and RF amplification.

8 Technical Training—The Method anticipates that the OES Operator will be trained in other technical aspects of radio communications likely to be encountered during an emergency, such as:
 a Emergency Station Setup—Under the Method, the OES Operator is trained in the details of being able to set up a temporary, portable, or mobile Emergency Station according to techniques known in the art.
 b Emergency Antennas—Under the Method, the OES Operator is trained in the details of being able to set up and deploy resonant or tuned portable emergency antenna systems, techniques which although in need of wider mastery are known in the art.
 c Phone operations—Under the Method, the OES Operator is trained in the details of phone operations, including net operations, microphone technique, and similar matters.
 d Digital operations—Under the Method, the OES Operator is trained in the details of digital operations, as described above.
 e Phone patch—Under the Method, the OES Operator is trained in the details of interfacing telephone systems with radio systems, so as to be able to replenish and supplement landline telephone service.
 f Internet interconnections—The United States Department of Defense has promulgated a standard technology for operation and management of HF radio networks, scil., MIL-STD-188-141B[3]. Under the Method, the OES Operator is trained in the details of interconnections of radio and internet, as described above, including Echo-Link®, and WinLink 2000 (two popular interface protocols), as well as ALE, Automatic Link Establishment:
  i Automatic Link Establishment, ALE, is a technique for maximizing the effectiveness of communications between two equipped High Frequency radio stations by testing and determining the frequency at which propagation is most effective between the two stations.
  ii Automatic link establishment is a robust, adaptive HF radio method for automatically establishing communications, networking, linking protection, high-speed data modems, and basic HF radio parameters over HF single sideband (SSB) links.
  iii Using ALE, an operator or computer-initiated control signal can automatically initiate point-to-point or point-to-multipoint calls.
  iiii The ALE controller can be programmed to scan one or more frequencies, pick the best frequency for operation, and switch to voice or data operation immediately upon link establishment (High Frequency Radio Automatic Link Establishment, ALE, Application Handbook, National Telecommunications and Information Administration, NTIA).
9 Low-Power Operations—Because the method is intended to be deployed and operated during an emergency, where commercial power may be sporadic or absent, this Method requires that each OES be capable of operating QRP, "low-power," without commercial power. This Method requires that each OES station be able to operate entirely on battery power.
10 60-Meter/5 MHz Operations—Recently, the FCC has made available to the Amateur Radio Community a small spectrum of discrete channels for Upper Sideband operations in the 60-Meter/5 MHz Band. Because these frequencies are nearly ideally suited for local and regional NVIS propagation, this Method requires that each OES be fully capable of operations on these frequencies.
11 EEPROM Software Equipment Modifications— Most modern Amateur Radio equipment is programmed, in part, by the use of EEPROMs ("electrically erasable programmable read-only memory"). In order to operate on the 60-Meter/5 MHz Band, modern equipment, such as the QRP Yaesu FT-817 require modification. The author of this Method has recently made available to the Amateur Radio Community instructions on how to induce the software product "SoftJump" (written by Peter, VK21T) to modify the equipment (these instructions have been incorporated into the software operations manual). This Method requires that each OES be capable of modifying the Station's equipment to operate on these frequencies, as follows:
  a Theory—The FT-817 can be programmed for different countries, personalities, and characteristics by writing logical values to the rig's EEPROM ("electrically erasable programmable read-only memory"). When the rig is treated to a master reset, the rig reads the logical values set by the hardware jumpers, or "solder blobs." On master reset, the rig writes these values to an "address" on the EEPROM, namely (for this purpose) 0x04 & 0x05. The SoftJump software "modification" sets the same bits that the solder blobs would set, by writing to the same address on the EEPROM, but without the master reset. Since the values set by SoftJump are the same as those which would be read by the solder blobs, the SoftJump modification results in the same modification to the rig that the solder blob mod produces. After a SoftJump manipulation has been applied, it will take effect upon the next power-up, and a subsequent master reset will overwrite the SoftJump settings, returning the rig to the solder-blob settings.
  b DOS Program—The SoftJump (DOS) program requires a CAT cable, a computer, and can be found at:
    http://groups.yahoo.com/group/FT817/files/softjump.zip>
  c Settings/Operation—(1) Set CAT to 38400 (Menu #14); (2) Run "ft.exe" from a DOS window to read (make a note of it) the current value; (3) Turn ARS off (see below); (4) Run "ft F8 BF " to write to the EEPROM; (5) "Please use <F8 BF>," says Peter; (6)<00 00> also opens the radio but results in the loss of VHF-Low (6-meters).
  d ARS—Repeater offsets (Automatic Repeater Shift) are country specific, so setting the FT-817 as "a rig without a country" removes the offset function. I found that the rig began to use a 100 KHz negative offset on every frequency until I turned the 144 ARS on (Menu #1) and the 430 ARS on (Menu #2) with the ARS set to 0.00 MHz (Menu #42). I then entered the specific repeater offsets as custom values in memory channels.
G Drill—In order to maintain high operator skill of the above-described operating skills, regular drills are required by this Method, and should include (variously):
  1 ARES/RACES Nets participation;
  2 HF/NVIS Nets participation;
  3 V/UHF Repeater Nets participation;
  4 Simplex Nets participation;
  5 Digital Systems Interfacing practice
    a Wi-Fi
    b Cellphone systems
    c Internet interface via ALE, WinLink 2000, or Echo-Link
      i Instant Messaging
      ii Email
      iii Email file attachments
      iiii Email Media attachments
    d Faxes;
  7 Public Service Events participation;
  8 Simulated Emergency Test participation (October of each year);
  10 Echo-Links® Wormholes exercises.
H Activation Methods—The Method requires that the OES Operators be notified of a disaster, using conventional and non-conventional means, including telephone; telephone tree; pagers; radio self-activation (operator discovers there is an emergency and activates the OES); email; and "Situation Reporting Protocols" (which to notify people of disasters) such as Citizen's Radio Network, Incident Page Network, National Incident Notification Network, and regional organizations such as Pennsylvania Situation Report:
  1 Citizen's Radio Network—CRN is an initiative to bring about a standard method and means for communities to stay in touch with and protect its residents during times of extreme emergencies.
    a CRN is not about replacing existing emergency services like REACT, ham radio or any public safety organization. It is about the ability for concerned citizens to help themselves if these groups are not available or do not serve the particular interests of that community.
    b CRN uses readily available (and widely available) radio equipment that does not require a license to operate it. Citizen's Band (CB) radio and Family Radio Service (FRS) radios are the basis of the equipment involved. By using these two radio services inexpensive equipment can be acquired without much effort. Both radio services are designed for personal communications and the radio equipment reflects this by being easy to use. This combination allows a much larger and diverse group of individuals to become involved in a CRN operation than if ham radio or commercially licensed radio services were used. Reference—http://www.angelfire.com/ma4/citizenradionet/
  2 Incident Page Network—IPN is the first and only service to send information on breaking fire and police incidents to your alpha-numeric pager from all over the United States, Canada and Australia! You're notified in real-time, as incidents are happening. Reference—http://www.incidentpage.net/
3 National Incident Notification Network—NINN is an Incident Notification Network with incident coverage in USA and Canada. NINN provides Breaking News Stories in the Police, Fire and EMS Services, as they Happen, long before they're shown in the local newscast or in the newspaper. Reference—http://www.ninn.org/index.shtml
4 Pennsylvania Situation Report Web Site—PA-SitRep.com was created in May of 2001 with the goal of bringing all forms of communications together to help the citizens of Pennsylvania better prepare for, and cope with, emergency and disaster situations in our communities and in our State, the goals being:
 a To make available the most comprehensive website for Emergency Communications information for Citizens of Pennsylvania via www.PA-SitRep.com.
 b To create some basic standards and protocols for emergency communications utilizing e-mail, landline phones, cell phones, text messaging via cell phones and pagers, Amateur Radio, FRS radios and CB radios. Every community and local government should have a basic communications protocol in place for their residents in the event of an emergency where normal means of communications are disrupted. Even a local network consisting of some neighbors with FRS radios and a few basic standards to follow in the event of an emergency is better than nothing at all.
 c To help bring those who are interested in doing so into the Amateur Radio Community where they will have the ability to communicate efficiently in times of disaster and where they can become part of a team of Amateur Radio Operators who are dedicated to volunteering their communications services in the event of an emergency.

II Describe the Governmental Agencies—This Method contemplates that the OES System, through its Section and District Emergency Coordinators, will interface with a variety of Governmental Agencies.
 A Structure—The OES Operator and the Section and District Emergency Coordinators must, under this Method, be familiar with the structure of each major, relevant Governmental Agency.
 B Interface Points—The OES Operator and the Section and District Emergency Coordinators must, under this Method, be familiar with the interface points within the structure of each major, relevant Governmental Agency, including:
  1 Formal, Official Contact Level—The Method first distinguishes that for each agency, there will be a formal, official contact person, who most probably be an administrator, but who may not have authority to make decisions, and who may not have technical experience.
  2 Authority Contact Level—The Method next distinguishes that for each agency, there will be a contact person with authority to make decisions, but who is most probably not an administrator, and who may not have technical experience.
  3 Experienced Person Level—The Method next distinguishes that for each agency, there will be a technically experienced contact person, but who may not have with authority to make decisions, and who is most probably not an administrator.
 C Contact Information Database—Each OES Operator should, under this Method, have immediate access to a Palm®-OS-based database of structure and contact information for each major, relevant Governmental Agency, including:
  1 Citizen Corps—Following the tragic events that occurred on Sep. 11, 2001, state and local government officials have increased opportunities for citizens to become an integral part of protecting the homeland and supporting the local first responders. Officials agree that the formula for ensuring a more secure and safer homeland consists of preparedness, training, and citizen involvement in supporting first responders. In January 2002, President George W. Bush launched USA Freedom Corps, to capture the spirit of service that has emerged throughout our communities following the terrorist attacks. Citizen Corps, a vital component of USA Freedom Corps, now part of the Department of Homeland Security, was created to help coordinate volunteer activities that will make our communities safer, stronger, and better prepared to respond to any emergency situation. It provides opportunities for people to participate in a range of measures to make their families, their homes, and their communities safer from the threats of crime, terrorism, and disasters of all kinds.
   a Citizen Corps programs build on the successful efforts that are in place in many communities around the country to prevent crime and respond to emergencies. Programs that started through local innovation are the foundation for Citizen Corps and this national approach to citizen participation in community safety. Citizen Corps is coordinated nationally by the Emergency Preparedness and Response Directorate (formerly FEMA). In this capacity, the Emergency Preparedness and Response Directorate (formerly FEMA) works closely with other federal entities, state and local governments, first responders and emergency managers, the volunteer community, and the White House Office of the USA Freedom Corps.
   b Citizen Corps operates a number of Programs, including Neighborhood Watch, Volunteers in Police Service, Community Emergency Response Teams and Medical Reserve Corps.
   c Reference—http://www.citizencorps.gov
  2 United States Department of Homeland Security—The new Department of Homeland Security (DHS) has three primary missions: Prevent terrorist attacks within the United States, reduce America's vulnerability to terrorism, and minimize the damage from potential attacks and natural disasters. Reference—http://www.dhs.gov/dhspublic/
  3 Emergency Alert System—The EAS is designed to provide the President with a means to address the American people in the event of a national emergency. Through the EAS, the President would have access to thousands of broadcast stations, cable systems and participating satellite programmers to transmit a message to the public. The EAS and its predecessors, CONELRAD and the Emergency Broadcast System (EBS), have never been activated for this purpose. But beginning in 1963, the President permitted state and local level emergency information to be transmitted using the EBS. The EAS system was established by the FCC in November of 1994 with the approval of Part 11 EAS rules. The EAS replaced the Emergency Broadcast System (EBS) as a tool the President and others may use to warn the public about emergency situations. Reference—http://www.fcc.gov/eb/eas/

4 Federal Communications Commission—The FCC operates, as a part of its Enforcement Division, an "Office of Homeland Security." This Office is responsible, among other things, for declaring communications emergencies.

5 Federal Response Plan—The concept of the FRP is simple: In a catastrophic disaster, the Federal government provides State and local governments with personnel, technical expertise, equipment and other resources, and assumes an active role in managing the response.
  a Resources are provided by one or more of 26 Federal departments and agencies and the American Red Cross.
  b Resources are grouped into 12 Emergency Support Functions (ESFs), including transportation, fire fighting, mass care, health and medical services, public works, urban search and rescue, and communications. Each ESF is headed by a Primary Agency. Other agencies provide support as necessary. Each agency responds within its own authorities.
  c Reference—ARES Field Resources Manual 6 Emergency Preparedness and Response Directorate (formerly FEMA, Federal Emergency Management Agency)—a former independent agency that became part of the new Department of Homeland Security in March 2003—is tasked with responding to, planning for, recovering from and mitigating against disasters. Emergency Preparedness and Response Directorate (formerly FEMA) can trace its beginnings to the Congressional Act of 1803. This act, generally considered the first piece of disaster legislation, provided assistance to a New Hampshire town following an extensive fire. In the century that followed, ad hoc legislation was passed more than 100 times in response to hurricanes, earthquakes, floods and other natural disasters.
  a As it has for more than 20 years, Emergency Preparedness and Response Directorate (formerly FEMA)'s mission remains: to lead America to prepare for, prevent, respond to and recover from disasters with a vision of "A Nation Prepared." At no time in its history has this vision been more important to the country than in the aftermath of September. 11 th.
  b Reference—http://www.fema.gov/

7 F-National Radio System—FNARS is an HF system primarily used by Emergency Preparedness and Response Directorate (formerly FEMA) for inter and intra-state communications between Emergency Preparedness and Response Directorate (formerly FEMA) Headquarters, Emergency Preparedness and Response Directorate (formerly FEMA) regions and the States during national and/or regional emergencies, particularly when landline systems are impaired or restricted. Reference—http://www.fema.gov 8 Military Affiliate Radio System—MARS is a Department of Defense sponsored program, established as a separately managed and operated program by the Army, Navy, and Air Force. The program consists of licensed amateur radio operators who are interested in military communications on a local, national, and international basis as an adjunct to normal communications. MARS has a long and proud history of providing world-wide auxiliary emergency communications during times of need. The combined three service MARS programs (Army, Air Force, and Navy-Marine Corps) volunteer force of over 5,000 dedicated and skilled amateur radio operators is the backbone of the MARS program. The benefit of MARS membership is enjoying an amateur radio hobby through the ever-expanding horizon of MARS. Our affiliate members' continued unselfish support of our mission keeps Army MARS Proud, Professional, and Ready. Reference—http://www.asc.army.mil/mars/

9 Mobile Emergency Response System—MERS, the Emergency Preparedness and Response Directorate (formerly FEMA)'s Operations Net, is a VHF highband system primarily used by Emergency Preparedness and Response Directorate (formerly FEMA) MERS for communicating with Emergency Preparedness and Response Directorate (formerly FEMA) personnel. Reference—http://www.fema.gov 10 National Warning System—NAWAS is a communications system originally designed and implemented in the 1950's as a means of notifying and preparing for a nuclear attack. Fortunately the system was never used for its intended purpose, but has proven invaluable to local emergency managers responding to or coping with natural disasters.
  a The National Warning System supports the nonmilitary actions taken by Federal agencies, by the private sector, and by individual citizens to meet essential human needs; to support the military effort; to ensure continuity of Federal authority at national and regional levels; and to ensure survival as a free and independent nation under all emergency conditions, including a national emergency caused by threatened or actual attack on the United States.
  b The system is used by local officials thousands of times a year for emergency management coordination and response. One typical scenario is the use of the system during tornadoes. As storms are sighted, emergency managers in one town or county can communicate with their colleagues in other counties who are in the path of the storm, advising them as to direction, speed, and intensity. The drawback to this system is it relies on human intervention. If there is no one there to receive the communications the warning is not disseminated. This has resulted in missed tornado warnings. Today modernization and automation are planned in most telecommunications systems.
  c Reference—www.globalsecurity.org/wmd/systems/nawas.htm 11 National Communication System—As an organization, the NCS brings together the assets of 23 Federal departments and agencies to address the full range of NS/EP telecommunications issues. It incorporates changing legislative, regulatory, judicial, and technical issues in interagency emergency telecommunications planning activities.
  a The NCS members include U.S. Department of State, U.S. Department of the Treasury, U.S. Department of Defense, U.S. Department of Justice, U.S. Department of the Interior, U.S. Department of Agriculture, U.S. Department of Commerce, U.S. Department of Health and Human Services, U.S. Department of Transportation, U.S. Department of Energy, Department of Veterans Affairs, Department of Homeland Security, Central Intelligence Agency, Federal Emergency Management Agency, The Joint Staff, General Services Administration, National Aeronautics and Space Administration, Nuclear Regulatory Commission, National Telecommunications and Information Administration, National Security Agency, United States Postal Service, Federal Reserve Board, Federal Communications Commission.
- b Throughout its 40-year history, the NCS has responded to the needs of the changing world environment, and stands ready to meet the challenges and uncertainty of the future. NCS coordinates the following Services: Advanced Intelligent Network (AIN), Alerting and Coordination Network (ACN), Emergency Notification Service (ENS), Government Emergency Telecommunications Service (GETS), National Coordinating Center (NCC), SHAred RESources (SHARES), Telecommunications Service Priority (TSP), Wireless Priority Service (WPS), Planning, Training & Exercise Branch.
- c Reference—http://www.ncs.gov 12 National Earthquake Information Center—The mission of the National Earthquake Information Center (NEIC) is to rapidly determine location and size of all destructive earthquakes worldwide and to immediately disseminate this information to concerned national and international agencies, scientists, and the general public. Reference—http://neic.usgs.gov/

13 Pennsylvania (Or Other State or Commonwealth) Emergency Management Agency—The mission of the Pennsylvania Emergency Management Agency is to coordinate state agency response, including the Office of the State Fire Commissioner and Office of Homeland Security, to support county and local governments in the areas of civil defense, disaster mitigation and preparedness, planning, and response to and recovery from man-made or natural disasters. We undertake this mission with clear customer-focus and a recognition that people are the most valuable asset. We value the contributions and dedication of the personnel who staff the emergency response and management systems. We employ and deploy the best available technologies in support of our mission. Above all, we cherish the men, women, families and children of this Commonwealth and work tirelessly to make our Pennsylvania a safe place to live and prosper. Reference—http://www.pema.state.pa.us/

14 Radio Amateur Civil Emergency Service—RACES, administered by local/county/state Emergency Management agencies, with guidance from the Emergency Preparedness and Response Directorate (formerly FEMA), is a part of the Amateur Radio Service that provides radio communications for civil-preparedness purposes only, during periods of local, regional or national civil emergencies. These emergencies are not limited to war-related activities, but can include natural disasters such as fires, floods and earthquakes. Reference—ARES Field Resources Manual.

15 Skywarn—SKYWARN is a group of trained severe weather spotters that report directly to the National Weather Service. Year after year, reports from SKYWARN observers have assisted the NWS in issuing timely warnings based on REAL-TIME reports. The NWS's primary mission is to issue warnings to protect life and property. The ground truth reports from SKYWARN spotters are a vital link in using advanced radar data and meteorological skills to carry out our mission. Their observations also provide us with information in compiling documentation of severe weather events and verification of warnings. These reports become part of the United States Storm Data publication, which is used by researchers and also provides climatological data on a wide variety of unusual weather phenomenon, including statistics on death, injuries, and property and crop damage. Over half of the spotters are also licensed amateur radio operators (a.k.a. hams). The hams throughout many of our counties meet and organize their spotter efforts on one radio frequency (network or nets), when severe weather threatens. Amateur Radio Emergency Services (ARES) provides communication support for the SKYWARN program. Reference—http://www.skywarn.org/

16 Specific Area Message Encoding—SAME is a system of broadcasted audio codes that trigger operation of compatibly equipped weather radios in a specific area. The system is operated by the National Oceanic and Atmospheric Administration (NOAA) through the National Weather Service (NWS) using the National Weather Radio (NWR) system.

17 Tsunami Warning System—The NWS operates two Tsunami Warning Centers and the International Tsunami Information Center. Reference—http://tsunami.gov/

III Describe the Non-Governmental Agencies—This Method contemplates that the OES System, through its Section and District Emergency Coordinators, will interface with a variety of Non-Governmental Agencies.

A Classifications of Non-Governmental Agencies—In general, this Method contemplates an interface with four types of Non-Governmental Agencies:
  1 Public Service—Public Service Agencies are private organizations, usually non-profit, that provide quasi-governmental relief functions, and include such organizations as the American Red Cross and the Salvation Army.
  2 Trade Organizations—Both Amateur Radio Operators and Public Service communicators frequently belong to trade organizations such as the American Radio Relay League and the Association of Public Safety Communications Officials International.
  3 Information Exchange—Many organizations serve as repositories for emergency communication information and resources.
  4 Notification Services—Several organizations have recently arisen whose goal is to notify selected or subscribed members to the existence of a nearby emergency or disaster.

B Structure—The OES Operator and the Section and District Emergency Coordinators must, under this Method, be familiar with the structure of each major, relevant Non-Governmental Agency.

C Interface Points—The OES Operator and the Section and District Emergency Coordinators must, under this Method, be familiar with the interface points within the structure of each major, relevant Non-Governmental Agency, including:
1. Formal, Official Contact Level—The Method first distinguishes that for each agency, there will be a formal, official contact person, who most probably will be an administrator, but who may not have authority to make decisions, and who may not have technical experience.
2. Authority Contact Level—The Method next distinguishes that for each agency, there will be a contact person with authority to make decisions, but who is most probably not an administrator, and who may not have technical experience.
3. Experienced Person Level—The Method next distinguishes that for each agency, there will be a technically experienced contact person, but who may not have with authority to make decisions, and who is most probably not an administrator.

D Contact Information Database—Each OES Operator must, under this Method, have immediate access to a Palm®-OS-based database of structure and contact information for each major, relevant Non-Governmental Agency, including:
1. Amateur Radio Emergency Service—The Amateur Radio Emergency Service (ARES) consists of licensed amateurs who have voluntarily registered their qualifications and equipment for communications duty in the public interest when disaster strikes. Every licensed amateur, regardless of membership in ARRL or any other local or national organization, is eligible for membership in the ARES. The only qualification, other than possession of an Amateur Radio license, is a sincere desire to serve. Because ARES is an amateur service, only amateurs are eligible for membership. The possession of emergency-powered equipment is desirable, but is not a requirement for membership.
   a There are three levels of ARES organization—section, district and local. At the section level, the Section Emergency Coordinator is appointed by the Section Manager (who is elected by the ARRL members in his section) and works under his supervision. In most sections, the SM delegates to the SEC the administration of the section emergency plan and the authority to appoint district and local ECs. It is at the local level where most of the organization and operation is effected, because this is the level at which most emergencies occur and the level at which ARES leadership makes direct contact with the ARES member-volunteers and with officials of the agencies to be served. The local EC is therefore the key contact in the ARES. The EC is appointed by the SEC, usually on the recommendation of the district EC (DEC). Depending on how the SEC has set up the section for administrative purposes, the EC may have jurisdiction over a small community or a large city, an entire county or even a group of counties. Whatever jurisdiction is assigned, the EC is in charge of all ARES activities in his area, not just one interest group, one agency, one club or one band.
   b In large sections, the SECs have the option of grouping their EC jurisdictions into "districts" and appointing a district EC to coordinate the activities of the local ECs. In some cases, the districts may conform to the boundaries of governmental planning or emergency-operations districts, while in others they are simply based on repeater coverage or geographical boundaries. Special-interest groups are headed up by "assistant emergency coordinators," designated by the EC to supervise activities of groups operating in certain bands, especially those groups which play an important role at the local level, but they may be designated in any manner the EC deems appropriate. These assistants, with the EC as chairman, constitute the local ARES "planning committee" and they meet together to discuss problems and plan projects to keep the ARES group active and well-trained. There are any number of different situations and circumstances that might confront an EC, and his ARES unit should be organized in anticipation of them. There is no specific point at which organization ceases and operation commences. Both phases must be concurrent because a living organization is a changing one, and the operations of a changing organization must change with the organization.
   c Reference—ARES Field Resources Manual
2. Amateur Radio Mutual Assistance Team—The ARESMAT concept recognizes that a neighboring section's ARES resources can be quickly overwhelmed in a large-scale disaster. ARES members in the affected areas may be preoccupied with mitigation of their own personal situations and therefore not be able to respond in local ARES operations. Accordingly, communications support must come from ARES personnel outside the affected areas. This is when help may be requested from neighboring sections' ARESMAT teams. To effect inter-sectional support mechanisms, each Section Emergency Coordinator (SEC) should consider adopting the following principles in their ARES planning: Pre-disaster planning with other sections in the Division, and adjoining sections outside the Division. Planning should be conducted through written memoranda and in-person at conventions and director-called cabinet meetings. An ARESMAT inter-sectional emergency response plan should be drafted. Development of a roster of ARESMAT members able, willing and trained to travel to neighboring sections to provide communication support inside the disaster area. Inter-sectional communication/coordination during and immediately following the onslaught of the disaster. Post-event evaluation and subsequent revision/updating of the inter-sectional emergency response plan. Reference—http://www.arrl.org/FandES/field/pscm/sec1-ch3.html
3. Amateur Radio Disaster Service—Since the beginning of radio, have been involved in sending life saving information in and out of disaster areas. During and after Earthquakes, Floods, Hurricanes and Tornadoes, Hams have been there to assist local, state and federal agencies and relief organizations such as the American Red Cross and Salvation Army. By way of the National Traffic System, (NTS) they send health and welfare messages to family members outside of a disaster areas to give information on loved ones. When telephones and cellular phone service is interrupted by a disaster, Hams have the ability and means to get the messages in and out when needed. Reference—http://www.ares.org
4. American Red Cross—Each year, the American Red Cross responds immediately to more than 67,000 disasters, including house or apartment fires (the majority of disaster responses), hurricanes, floods, earthquakes, tornadoes, hazardous materials spills, transportation accidents, explosions, and other natural and man-made disasters.

a Although the American Red Cross is not a government agency, its authority to provide disaster relief was formalized when, in 1905, the Red Cross was chartered by Congress to "carry on a system of national and international relief in time of peace and apply the same in mitigating the sufferings caused by pestilence, famine, fire, floods, and other great national calamities, and to devise and carry on measures for preventing the same." The Charter is not only a grant of power, but also an imposition of duties and obligations to the nation, to disaster victims, and to the people who generously support its work with their donations. Red Cross disaster relief focuses on meeting people's immediate emergency disaster-caused needs. When a disaster threatens or strikes, the Red Cross provides shelter, food, and health and mental health services to address basic human needs. In addition to these services, the core of Red Cross disaster relief is the assistance given to individuals and families affected by disaster to enable them to resume their normal daily activities independently. The Red Cross also feeds emergency workers, handles inquiries from concerned family members outside the disaster area, provides blood and blood products to disaster victims, and helps those affected by disaster to access other available resources.

b Reference—http://www.redcross.org/services/disaster/

5 Association of Public Safety Communications Officials International—APCO is a member driven association of communications professionals that provides leadership; influences public safety communications decisions of government and industry; promotes professional development; and, fosters the development and use of technology for the benefit of the public. APCO International is the world's oldest and largest not-for-profit professional organization dedicated to the enhancement of public safety communications. With more than 16,000 members around the world, APCO International exists to serve the people who manage, operate, maintain, and supply the communications systems used to safeguard the lives and property of citizens everywhere. Reference—http://www.apcointl.org/

6 National Disaster Medical System—The National Disaster Medical System is a federally-coordinated initiative to augment the nation's emergency medical response capability. The overall purpose of NDMS is to establish a single national medical response capability for:

a Assisting state and local authorities in dealing with the medical and health effects of major peacetime disasters; and b Providing support to the military and VA medical systems in caring for casualties evacuated back to the US from overseas armed conflicts.

c NDMS has three major components: (I) Disaster Medical Assistance Teams (DMATs) and Clearing-Staging Units (CSUs) with necessary supplies and equipment which will be dispatched to a disaster site within the United States from the country's major metropolitan areas. DMATs/CSUs may also provide NDMS patient reception services at their home locations; (2) An evacuation capability for movement of patients from a disaster area to locations where definitive medical care can be provided; and (3) A voluntary hospital network which will provide definitive care.

d Reference—ARES Field Resources Manual

7 The National Association of Radio & Telecommunications Engineers, Inc.—NARTE is a worldwide, non-profit, professional telecommunications association which certifies qualified engineers and technicians in the fields of Telecommunications, Electromagnetic Compatibility/Interference (EMC/EMI), Electrostatic Discharge control (ESD) and Wireless Systems Installation. NARTE also administers FCC Commercial Operator License Exams (see FCC Testing). Reference—http://www.narte.org/

8 National Traffic System—The National Traffic System (now discredited by the ARRL, see above) is designed to meet two principal objectives: rapid movement of traffic from origin to destination, and training amateur operators to handle written traffic and participate in directed nets. NTS operates daily, and consists of four different net levels—Area, Region, Section, and Local—which operate in an orderly time sequence to effect a definite flow pattern for traffic from origin to destination.

a When a disaster situation arises, NTS is capable of expanding its cyclic operation into complete or partial operation as needed. ECs in disaster areas determine the communications needs and make decisions regarding the disposition of local communications facilities, in coordination with agencies to be served. The SEC, after conferring with the affected DECs and ECs, makes his recommendations to the Section Traffic Manager and/or NTS net managers at section and/or region levels. The decision and resulting action to alert the NTS region management may be performed by any combination of these officials, depending upon the urgency of the situation. While the EC is, in effect, the manager of ARES nets operating at local levels, and therefore makes decisions regarding their activation, managers of NTS nets at local, section, region and area levels are directly responsible for activation of their nets in a disaster situation, at the behest of and on the recommendation of ARES or NTS officials at lower levels.

b Reference—ARES Field Resources Manual

9 National Voluntary Organizations Active in Disaster—NVOAD coordinates planning efforts by many voluntary organizations responding to disaster. Member organizations provide more effective and less duplication in service by getting together before disasters strike. Once disasters occur, NVOAD or an affiliated state VOAD encourages members and other voluntary agencies to convene on site. This cooperative effort has proven to be the most effective way for a wide variety of volunteers and organizations to work together in a crisis.

a NVOAD serves member organizations through: Communication—disseminating information through electronic mechanisms, its Newsletter, the directory, research and demonstration, case studies, and critique. Cooperation—creating a climate for cooperation at all levels (including grass roots) and providing information. Coordination—coordinating policy among member organizations and serving as a liaison, advocate, and national voice. Education—providing training and increasing awareness and preparedness in each organization. Leadership Development—giving volunteer leaders training and support so as to build effective state VOAD organizations. Mitigation—supporting the efforts of federal, state, and local agencies and governments and supporting appropriate legislation. Convening Mechanisms—putting on seminars, meetings, board meetings, regional conferences, training programs, and local conferences. Outreach—encouraging the formation of and giving guidance to state and regional voluntary organizations active in disaster relief.
    b Reference—http://www.nvoad.org
  10 Radio Emergency Associated Communications Teams—REACT's mission is to provide public safety communications to individuals, organizations, and government agencies to save lives, prevent injuries, and give assistance wherever and whenever needed, striving to establish a monitoring network of trained volunteer citizen-based communicators using any and all available means to deliver the message. Reference—http://www.reactintl.org/
  11 Salvation Army Team Emergency Radio Network—SATERN is a corps of Amateur Radio volunteers who have united themselves with the Disaster Services program of the Salvation Army. This group provides the Salvation Army with the nucleus of their communications support system in the event of an emergency. The Primary objectives of SATERN are: 1) To develop and maintain a corps of Amateur Radio operators, skilled in emergency trafficking and communications, to assist The Salvation Army during times of disaster. 2) Assist in training other Salvation Army personnel to access and use the resource of Amateur Radio for local, regional, national, and international disasters. 3) Development of training materials and exercises designed to enhance the use of Amateur Radio within the Salvation Army Disaster Services programs. Any licensed Amateur Radio Operator is eligible to serve as a volunteer member of the SATERN team. The only restriction on a potential volunteer is that they cannot be currently serving as a communications volunteer for another major private relief agency such as the Red Cross. Volunteers may belong to RACES, ARES, Skywarn or any Amateur Radio club. Reference—http://www.salvationarmydisasterservices.org/satemStatement.html
  12 Society of Broadcast Engineers—The Society of Broadcast Engineers, formed in 1963, is a non-profit organization serving the interests of Broadcast Engineers, devoted to the advancement of all levels of Broadcast engineering. Reference—http://www.sbe.org
IIII Identify the ARES/RACES Structure, People, and Activities—The Method interfaces very closely with the ARES/RACES organizations, because these organizations are charged with activating Amateur Radio during an emergency. Each OES should participate in both ARES and RACES. ARES structure is described in detail above.
  A ARES/RACES Confusion—RACES is an organization in the process of profound change. Because ARES and RACES overlap considerably in function, there is a trend toward merging the two organizations. Local political in-fighting is slowing the merger of the two organizations. On the one hand, RACES is more formal, being created and supported by law. On the other hand, ARES has the support of the ARRL, making it more expansive. Participation in RACES is limited by law, participation in ARES in encouraged by practice.
  B Leadership of the ARES–This Method involves close coordination with ARES, in the sense that all OESs will be appointed as OESs as part of the formal ARES structure.
  C Contacting ARES Leadership—This Method contemplates that contact with ARES leadership under the same interface system as described above:
    1 Formal, Official Contact Level—The Method defines the ARES formal contact as the Section Manager.
    2 Authority Contact Level—The Method defines the ARES authority contact as the EC, Emergency Coordinator.
    3 Experienced Person Level—The Method defines the experienced contact as the Section Emergency Coordinator.
V Variations & Additional Training Services—This Method is adaptable to many situation in addition to the OES/ARES system in which the Method is described.
  A Instead of using the ARRL/ARES/OES System, this Method could be implemented by training a group of licensed Amateur Radio Operators independently of the ARRL.
  B Instead of using the ARRL/ARES/OES System, this Method could be implemented by training a group of licensed General Radio Operators independently of the ARRL or Amateur Radio.
  C Instead of interfacing with the listed governmental and non-governmental agencies specified, the Method could interface with other, successor, or consolidated agencies.
  D Instead of relying upon high frequency bands for communications, the Method can succeed using merely EchoLink or V/UHF Repeater systems.
  E Instead of using NVIS propagational devices, the Method can rely upon line-of-site, groundwave, skywave, or ionospheric propagation.
  F Instead of developing competence in all of the specified digital modes, the Method can rely upon any subset of digital capabilities.
  G Instead of developing competence in Wi-fi, cellular activation, and the specified digital modes, the Method can rely upon any subset of these modes and skills.
  H Instead of relying upon the ARECC educational program, the Method can rely upon any competent training program.
  I Instead of adopting the ARRL standardized traffic handling system, the Method can rely upon any competent message or traffic handling system.
  J Instead of relying upon the specified Internet interconnection systems such as WinLink and ALE, the Method can rely upon any Internet interconnection system.
  K Instead of relying upon the specified activation systems, the Method can rely upon any activation system.
  L Instead of using the Palm® OS-based system for database management, this Method could be implemented by paper database or by any other battery operated database system, such as laptop or notebook computers, and other PDA devices.
  M The details of the techniques used in this Method can be the subject of privately sponsored educational seminars.
  N The details of the techniques used in this Method can be the subject of privately sponsored continuing legal educational seminars.
  -VI—Database Management
  A key element of this Method is the use of a Palm® OS-based system for maintaining a database of critical information for the use of OESs.

A Palm® OS-based system—This Method uses the Palm® OS-based system (or the equivalent) for database management because it is easily updated, and being battery operated, is readily available to the OES in the even of a power failure.

B OES Critical Data Database—Each OES, as part of this Method, will have access to a "critical database," including information such as the following:

1 "What to do First" -- A disaster or emergency has occurred, and the OES shall have a checklist of what to do first, including protection of the OES's own family and property,.
2 Equipment for the "Go-Pack"
3 ARES Data:
   a     SECs
   b     DECs
   c     ECs
   d     AECs
   e     OESs
   f     Effective OES intercontact times & frequencies
4 ARES Net Time & Frequency
5 RACES Net Time & Frequency
6 NTS Net Time & Frequency
7 Skywarn Net Time & Frequency
8 Incident Command System Explanation/Chart
9 ARRL/ARES Message Handling:
   a     ARL
   b     Format
   c     Precedence
   d     Instructions
10 Contact Data: Skywarn/NWS, Red Cross, EOCs, Public Safetys
11 Local Repeater Directory
12 ARES Map
13 Section Emergency Plan
14 Operating Aids:
   a     Frequencies & Band Plans
   b     Phonetic
   c     Q Signals
   d     RST
   e     Prosigns
B   Contact List
   1 OES Contacts
   2 Governmental Agency Interface Points
   3 ARES/RACES Interface Points
   4 Non-governmental Interface Points
... Resources, Credits, & References
   ARRL information, including the description of the ARRL, OES, and DEC
   <http://www.arrl.org>
   ARES Field Resources Manual
   ARECC Emcomm Level 1 Course Materials
   Public Service Communications Manual
   DEC Resource List
   Disaster Response
   <http://216.202.128.19/dr/static.htm>
   EmComm.Org
   <http://www.emcomm.org>
   The United States Coast Guard
   <http://www.uscg.mil>

Data Encryption & Non-Amateur Bands—The above-described Method refers to the use of the Amateur Radio frequency bands. The current FCC rules and regulations allow the use of Amateur frequencies for the transmission of data transferred to data emission codes and techniques whose technical characteristics have been documented publicly.

§97.309 RTTY and data emission codes.

(a) Where authorized by §97.305(c) and 97.307(f) of this Part, an amateur station may transmit a RTTY or data emission using the following specified digital codes:

(1) The 5-unit, start-stop, International Telegraph Alphabet No. 2, code defined in International Telegraph and Telephone Consultative Committee Recommendation F.1, Division C (commonly known as Baudot).

(2) The 7-unit code, specified in International Radio Consultative Committee Recommendation CCIR 476-2 (1978), 476-3 (1982), 476-4 (1986) or 625 (1986) (commonly known as AMTOR).

(3) The 7-unit code defined in American National Standards Institute X3.4-1977 or International Alphabet No. 5 defined in International Telegraph and Telephone Consultative.

Committee Recommendation T.50 or in International Organization for Standardization, International Standard ISO 646 (1983), and extensions as provided for in CCITT commendation T.61 (Malaga-Torremolinos, 1984) (commonly known as ASCII).

(4) An amateur station transmitting a RTTY or data emission using a digital code specified in this paragraph may use any technique whose technical characteristics have been documented publicly, such as CLOVER, G-TOR, or Pac-TOR, for the purpose of facilitating communications.

(b) Where authorized by §§97.305(c) and 97.307(f) of this Part, a station may transmit RTTY or data emission using an unspecified digital code, except to a station in a country with which the United States does not have an agreement permitting the code to be used. RTTY and data emissions using unspecified digital codes must not be transmitted for the purpose of obscuring the meaning of any communication. When deemed necessary by an EIC to assure compliance with the FCC Rules, a station must:

] (1) Cease the transmission using the unspecified digital code;

(2) Restrict transmissions of any digital code to the extent instructed;

(3) Maintain a record, convertible to the original information, of all digital communications transmitted.

Another FCC rule specifically prohibits transmission of coded data:

§97.113 Prohibited transmissions.

(a) No amateur station shall transmit:

(1) Communications specifically prohibited elsewhere in this Part;

(2) Communications for hire or for material compensation, direct or indirect, paid or promised, except as otherwise provided in these rules;

(3) Communications in which the station licensee or control operator has a pecuniary interest, including communications on behalf of an employer. Amateur operators may, however, notify other amateur operators of the availability for sale or trade of apparatus normally used in an amateur station, provided that such activity is not conducted on a regular basis;

(4) Music using a phone emission except as specifically provided elsewhere in this Section; communications intended to facilitate a criminal act; messages in codes or ciphers; intended to obscure the meaning thereof, except as otherwise provided herein; obscene or indecent words or language; or false or deceptive messages, signals or identification;

(5) Communications, on a regular basis, which could reasonably be furnished alternatively through other radio services.

It is anticipated that there may be a commercial market for this Method, i.e., companies which desire a secure, reliable, private, and dependable long distance communication system during a disaster or during the disruption of the existing communications infrastructure.

Also, existing organizations such as emergency service providers, public safety authorities, government law enforcement officials, banks, stock exchanges, and corporations may also be a commercial market for this Method, because they similarly may require a secure, reliable, private, and dependable long distance communication system during a disaster or during the disruption of the existing communications infrastructure.

Therefore, a variation of this Method involves the use of non-Amateur frequency bands, and also the use of non-publicly documented encryption schemes.

The third of the electromagnetic implements of the present invention is ARMS™—hardware and/or software which embrace advanced voice recognition techniques to realize unattended voice message receipt, storage and delivery for any radio transmission. "ARMS" stands for Automated Radio Messaging Service and allows for the storage and archiving of radio messages in a way much more sophisticated than the mere sequential recording of voice messages typical of telephone messaging systems. More particularly, automated radio messaging service according to the invention uses advanced voice recognition techniques to permit unattended voice message receipt, storage, and delivery upon demand and the demand format can be text as well as recorded voice. While there are many automated attendant services and softwares available for voice messaging, Automated Radio Message Service offers a number of unique features specifically for the radio community. Most voice messaging systems are using voice recognition technology that can recognize a very small number of words and numerals spoken by a very large number of people. The invention instead recognizes a large number of words, characters and numerals spoken by a few registered users. ARMS™ registered users train the software at a given repeater or repeaters specifically to recognize their voices. Again, most commercial automated voicemail systems use recording technology to store and replay the voice messages, generally over a network server. Because ARMS™ uses customized profiles actually to transcribe the users' messages, and stores them a simple text or HTML files, the messages can be viewed on a computer, acted on by the reader, and can be mined by suitable software agents if desired. ARMS™ can thus be set up in a portable or temporary location without the presence of commercial power or internet service, and can be accessed by simple radios under adverse conditions, and can be managed visually on the computer by a dispatcher, Net Control, or Incident Commander, making ARMS™ ideal for emergency communication purposes.

Explained in a different way, ARMS™ is a messaging system that receives and archives radio transmissions in at least two forms, namely, a recorded voice message and a parallel text file of the voice message as transcribed by voice recognition software. The system is useful for both registered and unregistered users. Registered users have already trained the voice recognition software used by the ARMS system. For two registered users, the caller identifies himself (or herself) and identifies the registered user for whom the message is intended. The system can then record and transcribe the message and retain the message until the subscriber for whom the message is intended logs in to check messages. In a similar way as described above, the sender's message may be retained as either a voice file or a text file and the recipient may retrieve either a voice or a text message. The flexibility afforded by ARMS is critical in an emergency management setting. Depending on the portable equipment that is actually working in an emergency, one may or may not have to retrieve messages by voice mail or e-mail, and may have no choice as to which. For example, under adverse conditions, one's cellular telephone may be working but one's laptop battery may be dead—or possibly the laptop will work but the cellular telephone will not function, or possibly neither will work and the handheld radio transceiver is the only remaining way to check for messages. The importance of ARMS, therefore, is that users may choose which mode of message they will retrieve and registered users will virtually always have a choice of voice or text. Messages may be prioritized by the sender and/or may be prioritized by pre-program request by the recipient.

In distinction to the generalized disclosure, above, regarding the MDT™ interconvertibility of voice mail to e-mail and back, ARMS is both narrower than and larger than the conceptual use of voice recognition software to create a computer voice font transmission and then reliably to transcribe that transmission. ARMS is intended specifically for the radio community and most particularly for the emergency and/or public service radio community. Inevitably, UHF and VHF radio transmissions will forever provide the backbone of emergency communications, and yet at this writing if one does not receive a transmission in real time one has no way of getting that same message later. ARMS thus provides reliable automatic radio messaging to radio operators. When the radio operators are all ARMS registered, then they may all leave and receive voice or e-mail messages at will. When one or more users are unregistered, the unregistered users have two choices. First, the unregistered user may leave a simple voice mail message in his or her own voice, retrievable only as a voice mail message. Alternatively, the unregistered user may convert his or her own voice message to a computer voice generated font and leave the computer generated voice message with the ARMS computer, which can then provide the message to the recipient either as a computer voice file or as a text file. The main difference between the generalized application of MDT™ to voice mail transcription to e-mail and ARMS is that ARMS is for use by radio operators operating simplex or using repeaters such as amateur or public service repeaters. Any emergency communications operator can literally become the ARMS repeater in an emergency setting, so that emergency communications are not only routed through a traditional Net Control but are archived with the Net Control as well, for retrieval by others as the others log in. Even more importantly, ARMS can and does use communications modes in addition to MDT™, because the narrow bandwidth UHF and VHF transmissions characteristic of other electromagnetic implements of the present invention, i.e., QAMFM™, TONE63™, and etc., lend themselves particularly well to ARMS. ARMS is thus not intended for general messaging use over the non-emergency telephone or internet communications systems or their infrastructures, but is primarily for emergency and public service radio use.

An ARMS transmission might proceed as follows.

"Activate ARMS™ Service"—Monitor for a specific speaker independent macro command that activates the program; loads the program, expects to hear the user's callsign "Load Profile KB3FXI"—Load a Registered User's Profile; recalls the user's name; addresses the user by name; retrieves a list of the number and types of awaiting messages; Text-to-Speech playback of the number and types of messages "List Messages"—Lists priority, text, and recorded messages "Play Priority Messages"—Plays priority messages "Play Messages"—Plays messages "Play Message Number 3"—Plays message number 3

"Leave a Message for AE3C"—Records and transcribes a message for AE3C; stores in the AE3C folder "Leave a Priority Message for AE3C"—Records and transcribes a priority message for AE3C; stores in the AE3C folder "Replay Message"—Replays or respeaks the last message "Delete Message"—Deletes the message As described above, the ARMS archiving process which stores the same message in both voice and transcribed form for registered users can then be accessed either by voice (radio or telephone) or computer (text) log in. In addition, messages left may be prioritized by the sender, so that the subscriber for whom the messages are intended may replay the messages in the order of priority at least according to the opinion of the senders. Likewise, recipients can provide messaging priority using data mining. For emergency communications, the text transcriptions of the voice messages are extremely valuable. When a subscriber logs in to an ARMS™ system and requests all messages as text, the subscriber can easily scan all the text messages and perform his or her own triage on the urgency of the various messages. To listen in real time to a series of voice messages not ranked according to any priority might mean listening for a half an hour to messages wherein one buried message was truly urgent and might not be received in time for urgent action.

Although the invention so far has been described solely with respect to MDT™ (and all its applications), PORTA-BROWSER and ARMS, there are digital communications modes other than MDT™ which form an important part of the array of electromagnetic implements of the present invention. One of these implements is QAMFM™ and the other, a subset of QAMFM™, is TONE63™. Actually, the inventive superset to QAMFM™ is the use of any of the existing digital radio modes (CW, RTTY, Packet, MFSK31, B/QPSK31, MT63, Hellschreiber, Throb, Pactor, Clover, Olivia, etc. etc.), designed and intended for HF transmission such as single sideband using ionospheric propagation, over simple FM transmission instead. As described further below, this inventive superset can also optionally embrace both Forward Error Correction and customized vocabulary sets. Still, the use of these existing digital modes to bridge connections between computers using FM signals has not been attempted or accomplished to date.

QAMFM™ is data transmission using a novel combination of the use of Quadrature Amplitude Modulation (QAM) over a full quieting FM connection operating within a 3 KHz bandwidth using Forward Error Correction to achieve fast file transfer including but not limited to disaster information management. While QAM itself is already known-see for example U.S. Pat. No. 6,560,293, which is hereby incorporated herein by reference—the combined use of QAM over a full quieting FM connection operating within a 3 KHz (or less) bandwidth using Forward Error Correction has not been made to date. Quadrature amplitude modulation over FM allows for extremely fast data transfer in part because it provides multi-mode digital encoding combining QPSK (quadrature phase shift keying or even 16PSK, see below) with (four state) Amplitude Shift Keying (4ASK). With all these features in combination, data can be encoded using 45 degree or 90 degree (and theoretically up to twelve separate angle vectors) phase shift, plus four amplitude states in addition, which allows data to be concentrated in the inventive narrow (3 KHz or less) bandwidth heretofore unheard of for data transmissions. (While well-known in wired circuits, QAM is not common over radio connections, because ionospheric fading and FM multipath errors prevent accurate decoding—both of which may be circumvented with the inventive use of a full quieting FM signal.) Redundancy-based Forward Error Correction is important because wire based QAM connections are traditionally duplex burst mode based, using cyclic recycle check to decrease the number of received errors.

Forward Error Correction is a concept best illustrated by the use of the children's hand-motion song, "The Eensy Weensy Spider" (itself a digital phenomenon in that the finger motions use the digits). One way data are sometimes checked for accuracy uses duplex transmissions, where a transmission from point A to B is then repeated (or a mathematical summary is transmitted in return) from point B to A whereby the transmission as duplexed is checked at point A. If the signal is deemed to have been received accurately, then the next packet of data is sent. There is nothing wrong with duplex error correction except that the equipment and its function are far more complicated (i.e., there are two distinct radio frequencies in use simultaneously, requiring two separate transceivers). As an alternative, when one wishes to send data from point A to B, the data can instead be sent in short segments analogous to each finger-touch bridge of "The Eensy Weensy Spider." In other words, Forward Error Correction redundancy can send, say, 25 characters (or words) and then repeat the previous 25 characters or words, and then send the next successive 25 characters or words, so the receiving computer can compare each corresponding purportedly identical transmission sent at two separate times to confirm (or deny) that each segment is correct. Unmatched segments signal the operator that the data needs to be resent, possibly using another frequency or using higher power (or a better tuned antenna). (Interestingly, spell-checkers for HTML do already exist, but there is no automatic correction available for an error-containing HTML file at this writing. Therefore, HTML pages that are not sent without errors, as confirmed by Forward Error Correction redundancy, are best sent again.)

TONE63™ is QAMFM™ with vocabulary encoding rather than character encoding. In other words, under standard QAM techniques, each six bit (or seven bit) modulation change conveys the information about one or more individual characters from a set of characters such as ASCII. TONE63™, in order to obtain vastly higher data transfer rates, encodes to each six bit modulation change a word or a phrase instead of a character. The ubiquitous standard vocabularies in any communications setting mean that transmissions may predictably be compressed in this way.

As an aside explanation which helps to illustrate both QAMFM™ and TONE63™, the reason digital communications can be called "digital" is—ultimately you can explain or demonstrate what is happening in digital communications modes with your fingers (i.e., digits). The simplest mode of modulating a carrier of some kind is OOK, or on-off keying, such as the "short/long" typical of morse code. OOK modes can be demonstrated by the finger being either extended ("On") or retracted ("Off"). A more complex digital mode uses two frequencies, and the digital signal is either "high" (being transmitted on the higher frequency) or "low (transmitted on the lower frequency). This "Frequency Shift Keying" can be represented on the fingers by waving one or more fingers laterally.

A more complex and more modern digital mode uses the phase shift between a signal to send information. "Phase Shift Keying" (PSK) encodes at the transmission point a sine wave in-phase (relative to a reference point) to represent one digital state and out-of-phase to represent the second digital state. The combined waveform, harmonically complex, can be quickly, easily, and accurately detected and then reduced to its original simple harmonic content at the reception point by a computer sound card and a computer using Fourier analysis. A PSK signal using an in-phase and out-of-phase signal, mathematically 180 degrees apart, is known as Bipolar Phase Shift Keying, or BPSK. Computer soundcards, highly underutilized devices, are able to detect far more detailed phase shifts than 180 degrees. A PSK signal using four phases, each 90 degrees apart, ins known as Quadrature Phase Shift Keying, or QPSK, or 4PSK. More elaborate phase shifting is also possible, i.e., 8PSK, 16PSK, &c., and can be decoded using Fast Fourier Transforms, or FFT. This complex encoding can be represented by using both hands, with the fingers of one hand either not-, partially-, or completely overlapped (or interleaved) reative to the same finger(s) of the other hand.

An additional encoding method, available under the circumstances of a clear and "full-quieting" signal, is Amplitude Shift Keying, or ASK. Here, additional digital states are encoding by sending the sine wave at either high amplitude or low amplitude (2ASK), or at multiple discrete amplitudes, e.g. 4ASK. The computer soundcard can similarly detect and the computer can decode these amplitude shifts, represented on the fingers as partially- or fully-extended fingers.

Multi-level Modulation, or "ML," combines one or more of the digital modes, i.e., OOK, FSK, PSK, and ASK. Quadrature Amplitude Modulation, or QAM, is in the case of QAMFM™ and TONE63™, the uses of QPSK (or even 16PSK) combined with 4ASK, resulting in 64 states for each modulation stage, or 6 bits.

Ironically, computer sound cards are serendipitously perfectly suited to perform the Fast Fourier Transforms needed to decode quadrature phase shift keying and amplitude shift keying—even though sound cards were not designed with this application in mind. With the possibility of sound cards' propagating and detecting quadrature phase shift keying combined with amplitude shift keying, though, the use of computers and their sound cards as basic components of voice and data transmission means that computers can send and receive rich data transmissions all within the 3 KHz bandwidth-because the phase shifts amount to overlayering the data so that wideband transmissions are no longer needed.

Refinement of TONE63™ is proceeding in a five step development plan. In steps one and two, TONE63™ presently uses a PC sound card to generate via a software kernel 64 tones spaced 15.625 Hz apart, in the 1 KHz bandwidth using bipolar phase shift keying (180 degree phase shift). First, we shall use quadrature PSK (90 degrees phase shift) instead, by implementing and testing proprietary software improvements which have already been conceived to generate, through the PC sound card, quadrature phase shift rather than bipolar phase shift. Amplitude modulation through the sound card will be accomplished as well, to achieve Quadrature Amplitude Modulation. In step 3, the simplex channel combined with the above-described Forward Error Correction will be substituted for duplex or half-duplex corrections typical of the data correction techniques used by others. The Forward Error Correction to be specifically tested is the Walsh/Hadamard Forward Error Correction, which is a public domain algorithm, which will result in novel and robust QAM-FEC encoding. Fourth, vocabulary will be mapped so that allocated tones will correspond with each of the most commonly used emergency radio words, phrases, acronyms, letters and numerals, which step will we believe result in data transfer rates at DSL comparable speeds over a 1 KHz audio bandwidth. Fifth, testing of all of the above developments will be conducted over a wide variety of adverse conditions including but not limited to transmissions from basements, remote windowless interiors, low lying geographic areas outdoors including foliage of varying densities, and in unfavorable weather conditions using waterlogged microphones and ubiquitously failing power supplies.

Vocabulary encoding is one of the implements of the present invention, including but not limited to a) "term-of-art" and b) "fractal-algorithm-plus-vector" specialized vocabularies for data compression prior to transmission. Term-of-art vocabularies are alluded to immediately above in the context of step four of the development of TONE63™, namely, the mapping of vocabulary to allocated tones (for TONE63™); symbols or words (for MDT™) will correspond with each of the most commonly used emergency radio words, phrases, acronyms, letters and numerals, all of which serve to compress dramatically a data transmission containing that vocabulary. Any sort of vocabulary encoding is contemplated by the present method (including specialized vocabularies for specific applications, i.e., emergency radio communications, radio messaging, Red Cross or other Shelter communications, medical or hospital applications, money-handling institution applications, sporting events, and individual users), and when an MDT™ transmission is made, typical terms and phrases can be rendered as shorthand words or symbols to compress either or both the of the computer generated voice font files or the text files used for MDT™.

One particular type of vocabulary encoding contemplated by the present invention is "fractal-algorithm-plus-vector" encoding. Data compression, encoding, and transmission can be improved by recognizing patterns in data, transmitting the patterns, and then reconstructing the data at the reception point according to mathematical constructs. Simple data patterns can be explained using arithmetic. More complicated data patterns emerge when the data is viewed geometrically. Far more complex data patterns emerge under the mathematical light of calculus (i.e., Fourier analysis), but third wave information technologies necessarily involve far more complex patterns beyond the abilities of the calculus-based mathematics to describe them. The theory that perfectly describes the third wave information technologies is chaos theory and chaos theory is based, not upon calculus, but upon fractals or fractional differential equations. A sophisticated communications protocol using chaos theory and fractals conveys information to unbelievable speeds by deriving patterns from a two- or three-dimensional database and describing those patterns with a discrete set of fractal equations and vectors. One application of this theory would be in the compression of visual images, where distinct regions of the visual image could be defined fractally and then the resulting fractals and vectors would be prepared for transmission. Similarly, any data set including text, database, or sound file can be datamined for patterns and from those patterns the fractal algorithms and vectors could be derived. For the purpose of this invention, the inventor does not purport to have invented fractals-just to make the novel combination of using fractals to compress text, images, databases and sound files for MDT™ and TONE63™ transmission if not all data transmission. In other words, any data set, be it an image, a sound, a database or a text file of some kind, will to the computer demonstrate patterns. These patterns equal fractal algorithms and vectors, farm smaller in mathematical equation size than the data set itself, allowing unfathomable compression of the data for transmission purposes. Either MDT™ or TONE63™ can therefore, when equipped with a basic fractal-algorithm-and-vector vocabulary, derive from any data set the defining algorithms and vectors and then transmit just those algorithms and vectors leaving the recipient computer the task of reconstructing the data set from the same preset and predetermined algorithm and vector vocabulary.

As an extremely simple example of sending data by fractal-algorithm-plus-vector is to create a raster file of a blue circle sent by pixel-based jpeg format by sending a simple fractal algorithm commanding the recipient computer to create a circle of radius r and the color blue. Under fractal theory, any shape can be reduced to fractals, so why not send the definition (fractal-algorithm-plus-vector) instead of the raster (pixel-by-pixel) file? Texts can be rendered as fractals just as images can, because they contain internal patterns which can be transmitted by fractal-algorithm-plus-vector, with the patterns having been derived by any sort of data mining. Certainly at a minimum, computer storage and transmission of visual images should be accomplished using fractals and the compression they enable as described above.

While virtually all notebook and laptop computers have sound cards, many PDAs do not—but virtually all PDAs have infrared communication ability. Therefore, one of the electromagnetic implements of the present invention is an Infrared Mapping Interface described below. The Infrared Mapping Interface allows PDAs to serve as data collection and transmission sources (and recipients) for radio and other conveyances. In order to maintain a radio station under emergency conditions and operate the station without the use of commercial power, an Infrared Mapping Interface transfers data from a low-power consumption Personal Digital Assistant (PDA) to a low-power consumption Amateur radio. As a variation, the Interface could receive infrared data from a computer, or any other device. The interface operates as follows:

A Mathematical Mapping—The Infrared Mapping Interface mathematically maps the ascii (or equivalent) characters associated with the PDA to the corresponding sounds or modulated data transmitted by the radio. This mathematical map is a discrete one-to-one correlation between the infrared form of each ascii character in the PDA format and the corresponding data form of the same character in the radio data format. The map to be used in a particular instance will be determined by the particular PDA infrared protocol and the particular radio data protocol used by the equipment at hand.

1 PDA Infrared Protocols—PDA infrared protocols are well established, discrete, and well known. PDAs transfer data among themselves using reliable and well documented protocols.

2 Radio Data Protocols—Similarly, radios transfer data using a variety of well-established and well documented protocols, such as Pactor, Amtor, PSK31, and many others. Although these protocols vary considerably in bandwidth and modulation they all include the same basic ascii character set.

B Logical Rendition—The Infrared Mapping Interface renders the logical mapping using standard ubiquitous Boolean algebra. The Infrared Mapping Interface uses an EEPROM to store the map, permitting updates to the map to be flashed to the Infrared Mapping Interface device.

C Electronic Implementation—The Infrared Mapping Interface implements the logical rendition of the mapping using low voltage operational amplifiers configured into appropriate and, or, nand, & nor gates. The PIC programming is similarly stored by an EEPROM, allowing updates to the program by flashing the EEPROM. As an alternative, the Infrared Mapping Interface can be controlled by a Basic Stamp. Appropriate sounds and digital emanations are generated by oscillators.

In the context of infrared interfaces, it should be remembered that many laptops are equipped with Wi-Fi interfaces. In an emergency-indeed in any setting-a radio operator may set up a Wi-Fi "hot spot" with a specially tune antenna positioned in a high location, with a higher power input that most Wi-Fi, and make it possible for anyone with a laptop computer to interface with the emergency communications available by Wi-Fi. In other words, laptop computer users may, for unrestricted data, use Wi-Fi hot spots to obtain PORTA-BROWSER access or, when possible, emergency communications officers can use Wi-Fi and MDT™ to bridge computer communications of all kinds. It should be remembered, however, that at this writing Wi-Fi is wide band and, except for restoring localized Wi-Fi communications by laptop, the electromagnetic implements of the present invention are intended for use over VHF or UHF transmission using bandwidths of 3 KHz or less and in many cases 1 KHz.

Finally, the eighth electromagnetic implement of the present invention is really an overriding principle of communications that applies equally well to emergency communications and every-day communications: Shock-State Protocol. Shock-State Protocol is an on-demand communications re-deployment which, analogously to a human being in a state of shock and having restricted peripheral circulation, concentrates complexity near the heart of the system so that the equipment wielded by the individual user can be as simple as possible—namely, whatever is available such as "ear bud" transceivers, PDAs, laptop computers, FM or other simple handheld transceivers including typical walkie-talkies, modulated laser beam or, if nothing else is available, tin can and string arrays.

The most important thing to remember about Shock-State Protocol is that individual users should not have to manage—and should not even try to manage—several complicated communications electronics on a daily basis, whether they are in an emergency or not. It makes no sense for every person to use every day one or more cellular telephones, a PDA, a Blackberry®, an office telephone, a home telephone, and one or more personal computers. (Some cellular telephones debuting at this writing have 9 gigabyte hard drives in them—which at present seems ridiculously large. Some PDAs are so complex at this writing that they have more features and capacity than many laptop computers. In the hands of any user, all these complicated expensive hand-held things are going to do sooner or later and probably sooner is—to break!) An individual tempted to carry a lot of fancy electronics—including an emergency communications officer—would be much better served with a single piece of equipment, namely the personal computer, and a simple device with which to access and to govern that computer even if the computer and the user are not necessarily in the same location. After all, if you concentrate any complexity into a location where it can be redundant—backed up daily, for example, from a personal computer—you maximize the possibility of the user's being able to function. Consider the individuals who maintain important telephone lists on their cellular telephone SIM cards at this writing—it would make more sense if those same telephone lists were on the personal computer and remotely easily accessible when one wanted to make a telephone call. It would also make a lot more sense if the telephone call were then made by the same computer—possibly as an MDT™ transmission. Maintaining separate schedule or database information on a PDA and a laptop and constantly synchronizing the two makes no sense when one realizes that with MDT™ or TONE63™ a personal computer can be both operated and consulted from any remote location. By MDT™, any user can call his or her office and listen to a voice generated file of desired information, or direct that that computer voice generated file to be sent to and transcribed by any remote computer temporally convenient to the user—including a hotel television, among other devices. It really makes no sense for individuals to have to carry with them anything more than a miniature transceiver from which they may contact and govern their own personal computers from any location by telephone or radio transmission. This concept is the core of the Shock State Protocol: human beings should use simple, easily replaceable equipment to govern computers which are capable of duplication (and hence redundancy and backup), all in a setting where when needed networks can be restored using MDT™ or TONE63™ so that power or infrastructure failures do not curtail communications.

In adopting the Shock-State Protocol, communications officers and individual citizens will make a leap toward sophistication analogous to the sophistication leap which F16 fighter pilots made when their aircraft designers realized there was simple way too much complexity to the F16 cockpit for any pilot to manage. Fighter pilots cannot possibly look at, let alone comprehend, the plethora of switches and displays which the aircraft designers insist must be available in the cockpit. When the designers realized this, they added a new interface altogether and simplified all the pilot/aircraft communications with what amounted to a virtual "chalk line" orientation on the cockpit window: the "heads up" display. With the heads-up display, the pilot receives context-specific information in a prioritized and organized format so that s/he need not process an endless stream of raw data. Just as it is not fair to expect fighter pilots to read displays and monitor switches when they are looking out the cockpit window, it is not fair to expect a communications officer or an ordinary citizen to navigate a whole pile of electronic gear just to organize their communications lives, or to receive unprioritized messages and data at all. Shock-State Protocol provides the conceptual equivalent of a "heads up display" for communications users of all kinds, in that a single personal computer controls everything and that control is wielded by a simple dumb keyboard or small transceiver. Shock-State Protocol thus means, according to the invention, that every individual uses predominantly or only a single personal computer and one or more simple interfaces to that computer (transceivers, infrared devices, "ear buds," walkie-talkies, tin-can-and-string, etc.) and that the single personal computer is enabled with network bridging technology such as TONE63™ or MDT™ so that the computer can remain in communication with other voice and data sources both for daily use and for emergency use.

As a postscript, it should be noted that references to tin-cans-and-string throughout this specification are not meant to convey any humor whatsoever. Any physicist knows that a highly reliable way to send a sound transmission is by a taut string having amplifiers at each end (i.e., cups or tin cans). This inventor has already conducted cup-and-taut-string testing of various digital modes over FM or other audio transmission and can substantiate a number of instances in which digital modes were deployed with 100% accuracy even when a portion of the transmission was made by audio propagation over cup-and-string either to or from a computer sound card. If the reader still suspects any jocose aspect, as s/he should not, consider all the times there will be one or more laptop computers even in the same room and those computers cannot talk to one another. Most laptop computers at this writing do not have "floppy" drives any more; some laptop computers have CD drives but not CD burners; and many times users do not have particularly compatible software on their computers anyway (versions of software several years apart and etc.). With MDT™ or TONE63™ and sound cards, if nothing else is available a computer-to-computer transfer is always possible with cup-and-string, as this inventor has already accomplished at this writing. With longer range similar transmissions of feet, yards, miles or many miles, the ability of MDT™ and TONE63™ to constitute important electromagnetic implements is appreciated but not at the complete expense of the shorter-range-but-still-functional cup-and-taut-string array.

EXAMPLE 1

An important synthesis of admittedly only some of the inventions described herein occurs in real-time database creation for, for example, patient tracking. (The following example can be extrapolated to any other tracking or database creation function, such as tracking starting line and finishing line times for sculls in crew races, or tracking cargo or shipments when the geography of interest is not already equipped with functioning tracking infrastructure, or other permutations.)

Heretofore, at airline crash sites and other emergency sites where many patients must be triaged and transported, it has not been possible for medical personnel to track the locations of individual patients as they transition through triage, transport and either ultimate registration at an appropriate health care facility, or release due to lack of need for institutional care. The detriment to not being able to track patients is twofold, because the patients' care cannot be managed without knowing where the patients are, and family members either on the scene or who call in cannot be provided with anything approaching timely, and sometimes life-and-death, information. The present inventions combine to make emergency patient tracking a reliable reality.

In general to track a plurality of patients, the tracking data is transmitted, preferably by a human operator but by any available means, via voice or data transmission, to at least one of three receiving locations: 1) a voice-activated, speech-recognition-software enabled database capable of transcribing the transmission as a database entry directly; 2) an ARMS server which records and/or transcribes the transmission for recall and transmission/transcription on demand; and/or 3) a recording device which records (or transcribes) the transmission to a separate audio or data tape or file. Generally, the tracking data is transmitted according to a predefined set of fields, such as Patient Tag No. [w], Time [x], Medic ID [y], destination [z]. The transmission of the database entry can be according to comma-separated-value (where, if necessary, the speaker speaks the "comma,") or the commas can simply be omitted. When any or all of the receiving locations records the database entry, a database operator can assure the creation of the database as the transmissions are received—either directly, to the database, or by replay/transcription or other capture from either the ARMS server or the separate audio or data tape or file. As updated transmissions are received (i.e., same patient tag number but a later time) each transmission is stored in the database and can be sorted. So, if a first database entry is "patient tag number 234, 2:00 pm, Dr. Smith, Allegheny General Hospital" and a second database entry is "patient tag number 234, 2:05 pm, Dr. Jones, North Hills Passavant Hospital," the database entries can be sorted by the database operator or automatically, and the most recent entry will show the most recent (and authoritative) destination location for the patient. In the meantime, the original source material—the primary source material identifying information regarding the patient—is preserved directly in one or more of the database, the ARMS server, or the separate audio or data file. This means that the all-important information is stored as source material at the moment it is available—and the system provides for compiling and access to the data as needed.

As one of many permutations of scripts to implement the above, the following is typical of those of a "communications shadow" prepared to repeat information provided to him or her by a health care provider reporting on one patient at a time for creation of the patient tracking database:

Field Operator: "Activate ARMS service"
Computer: [please login]

-continued

| | |
|---|---|
| Field Operator: | KB3FXI |
| Computer: | [tone] "Welcome, Dave" |
| Field Operator: | "Record a message" |
| Computer: | "To whom would you like to send your message?" |
| Field Operator | "N3YP" |
| Computer: | "Please record your message to N3YP now" |
| Field Operator: | "Tag No. [w], Time [x], Medic ID [y], Destination [z]" |
| Field Operator: | "Replay message" (optional) |
| Field Operator: | "Send message" |

The above is repeated as needed for every database entry. As will be clear to those skilled in the art, any fields can be substituted for these exemplary fields, but the important thing is that the usual sort and management functions of the database can then be used on the database entries, such as sorting by patient tag number (to determine where a patient was dispatched to) or sorting by destination (to determine how many patients are en route to a given hospital) and etc.

Periodically, then, when the ARMS server (or other receiving location) is not occupied by reports from shadows, N3YP (see above—"N3YP" is the radio call sign, or any other identifier, of the recipient of all the transmissions, and thus N3YP is authorized to retrieve them all) logs into the ARMS server (or other receiving location) and proceeds as follows:

| | |
|---|---|
| N3YP: | "Activate ARMS service" |
| Computer: | "Please log in" |
| N3YP: | "N3YP" |
| Computer: | (gong or other tone specific to N3YP) "Welcome, Prescott" |
| N3YP: | [offline to the ARMS server] "Open Excel" |
| N3YP: | [audible to the ARMS server] Play messages |

When Excel is open and has been equipped with speech-recognition software, the played messages from the ARMS server transcribe directly into the database. Of course, if the transmissions automatically are transcribed into the database at the time each was transmitted, the separate replaying of message from the ARMS server will not be necessary. Murphy's Law is alive and well in radio transmissions, however, so even if the database is unable to transcribe each transmission in real time as it occurs for whatever reason (the Achilles Heel of all radio communications is that real time transmission/reception events fail more often than not), the database operator can repeat all the ARMS messages until all database entries reliably transcribe into the database. Happily, the operator of the database can listen to the replayed messages as they transcribe into the database and thus check them for accuracy as the database is being created. The infinite number of replays available from the ARMS server means that the database operator can replay any message for as many times (one or infinite) as is necessary to assure proper transcription and accuracy.

With a continuously created and updated database such as the above, the database can be managed as any database or spreadsheet in order to sort for the needed data. So, if the Emergency Operations Center asks for total patient numbers and destinations, the database/spreadsheet operator can query the database to sort by database, sort by time, and etc. If information is needed for a given patient, the database/spreadsheet operator sorts by tag number and then consults the database entry latest in time for that tag number. The querying of the database can be intermittent with the continued creation of the database.

Although the invention has been described above with reference to particular disclosure and specialized materials and methods, the invention is only to be limited insofar as is set forth in the accompanying claims.

The invention claimed is:

1. A method for interoperable communications, consisting essentially of: a) providing at least one computer having at least two sound paths; b) configuring said at least two sound paths with at least one signal receiving interface per sound path, with each said signal receiving interface being tuned to receive a different frequency and wherein said signal may be any sound, radio or electromagnetic encoded signal; and c) at least two users' transmitting data via a sound, radio or electromagnetic encoded signal, from a site from which data is collected, to said at least one computer over at least two frequencies and into each of said sound paths and further wherein at least one user transmits or receives signal comprising digital tone data with forward error correction, wherein said digital tone data has encoded within each six bit modulation change a word or phrase instead of a character, using a microphone and over the air via a narrowband FM signal at a bandwidth of 3 KHz or less, and further wherein said method uses only radios and computers without reliance on pre-existing radio repeaters or any hard wired infrastructure and is effective to provide data transmission even under extremely adverse reception conditions.

2. The method according to claim 1 wherein the method is conducted using only portable battery power.

3. A method for interoperable communications, consisting essentially of sending or receiving at least one digital radio signal containing digital tone data encoded as tones, wherein said digital tone data has encoded within each six bit modulation change a word or phrase instead of a character, and transmitted via an audio channel or using a microphone and over the air, said radio signal comprising a narrowband FM signal at a bandwidth of 3 KHz or less wherein said data is sent and received with forward error correction to a receiver equipped with a computer to receive and correct the data, and further wherein said method uses only radios and computers without reliance on pre-existing radio repeaters or any hard wired infrastructure and is effective to provide data transmission even under extremely adverse reception conditions.

4. The method according to claim 3 wherein said forward error correction is Walsh/Hadamard Forward Error Correction, said signal bandwidth is 1KHz or less and further wherein at least one of said FM signals is transmitted from a speaker device and received by a microphone.

5. A communications system for interoperable communications containing hardware and software, consisting essentially of: at least one computer, said computer having at least one sound path, said at least one sound path being tuned to at least one FM frequency to receive or to transmit a signal of 3 KHz bandwidth or less, said computer having software for both recording and transcribing one or more received FM transmissions of 3 KHz bandwidth or less transmitted using a microphone to a transcription site, wherein said FM transmissions contain digital tone data, wherein said digital tone data has encoded within each six bit modulation change a word or phrase instead of a character, and further wherein said software controls retransmission of said recorded or transcribed FM signals over the air as requested by a logged-in user of said system, and further wherein said method uses only radios and computers without reliance on pre-existing radio repeaters or any hard wired infrastructure and is effective to provide data transmission even under extremely adverse reception conditions.

6. A communications system for interoperable communications containing hardware and software, consisting essentially of at least one computer, said computer having at least two sound paths, wherein each of the at least two sound paths possesses a corresponding signal receiving interface; wherein each said signal receiving interface is tuned to receive a different frequency signal and wherein the signal may be any sound, radio or electromagnetic encoded signal; at least two signal transmission devices wherein at least one signal transmission device is a radio for transmission of signal digital tones data using a microphone over the air of a signal corresponding to at least one frequency of at least one signal receiving interface, said signal comprising both digital tones and a signal having a bandwidth of 3 KHz or less, wherein said digital tones data has encoded within each six bit modulation change a word or phrase instead of a character; and software in said computer which organizes signals received via the signal receiving interfaces for further output to a user, and further wherein said method uses only radios and computers without reliance on pre-existing radio repeaters or any hard wired infrastructure and is effective to provide data transmission even under extremely adverse reception conditions.

* * * * *